(12) United States Patent
Togashi et al.

(10) Patent No.: US 7,099,138 B1
(45) Date of Patent: Aug. 29, 2006

(54) MULTILAYER CAPACITOR

(75) Inventors: Masaaki Togashi, Nikaho (JP); Taisuke Ahiko, Nikaho (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/336,886

(22) Filed: Jan. 23, 2006

(30) Foreign Application Priority Data

Jan. 28, 2005 (JP) .......................... P2005-021952

(51) Int. Cl.
*H01G 4/005* (2006.01)
*H01G 4/06* (2006.01)

(52) U.S. Cl. ...................................... 361/303; 361/311
(58) Field of Classification Search ........ 361/303–305, 361/311–313, 306.1, 306.2, 306.3, 309
See application file for complete search history.

(56) References Cited

U.S. PATENT DOCUMENTS

| | | | |
|---|---|---|---|
| 6,191,932 B1 * | 2/2001 | Kuroda et al. .............. | 361/303 |
| 6,292,350 B1 * | 9/2001 | Naito et al. ............... | 361/306.3 |
| 6,914,767 B1 * | 7/2005 | Togashi et al. ............ | 361/303 |
| 6,940,710 B1 * | 9/2005 | Lee et al. ................ | 361/321.2 |
| 6,956,730 B1 * | 10/2005 | Togashi ...................... | 361/309 |
| 7,019,958 B1 * | 3/2006 | Togashi et al. ............. | 361/303 |
| 2003/0099083 A1 * | 5/2003 | Ohtsuka et al. ............ | 361/303 |

FOREIGN PATENT DOCUMENTS

JP      A-2004-140211      5/2004

* cited by examiner

*Primary Examiner*—Eric W. Thomas
(74) *Attorney, Agent, or Firm*—Oliff & Berridge, PLC

(57) ABSTRACT

A multilayer capacitor comprises a multilayer body and a plurality of terminal electrodes formed on the multilayer body. The plurality of terminal electrodes include first and second terminal electrodes. The multilayer body is constructed by alternately laminating a plurality of dielectric layers and first and second inner electrode layers. The first inner electrode layer includes a first lead electrode electrically connected to the first terminal electrode and a first capacitor electrode forming a capacitance component. The portion positioned between a pair of slits provided in the first capacitor electrode is continuous with the first lead electrode. The second inner electrode layer includes a second lead electrode electrically connected to the second terminal electrode and a second capacitor electrode forming a capacitance component. The portion positioned between a pair of slits provided in the second capacitor electrode is continuous with the second lead electrode.

21 Claims, 17 Drawing Sheets

MULTILAYER CAPACITOR

BACKGROUND OF THE INVENTION

1. Field of the Invention

The present invention relates to a multilayer capacitor.

2. Related Background Art

Known as this kind of multilayer capacitor is one comprising a multilayer body in which a plurality of dielectric layers and a plurality of inner electrode layers are alternately laminated, and a plurality of terminal electrodes formed on the multilayer body (see, for example, Japanese Patent Application Laid-Open No. 2004-140211).

Power supplies for central processing units (CPUs) mounted in digital electronic devices have been increasing their load current while lowering their voltage. Therefore, it has become quite difficult to suppress the fluctuation in power supply voltage under a tolerable level in response to a drastic change in load current. Hence, a multilayer capacitor known as decoupling capacitor has come into connection with a power supply. At the time when the load current fluctuates transiently, the multilayer capacitor supplies a current to the CPU, thereby suppressing the fluctuation of the power supply voltage.

In recent years, as the CPUs have further been raising their operating frequencies, the load current has been becoming faster and greater. Therefore, the multilayer capacitor used in the decoupling capacitor is demanded to increase both of its capacitance and equivalent series resistance (ESR).

SUMMARY OF THE INVENTION

However, the multilayer capacitor disclosed in Japanese Patent Application Laid-Open Nos. 2004-140211 does not take the equivalent series resistance into consideration. Further, the multilayer capacitor disclosed in Japanese Patent Application Laid-Open Nos. 2004-140211 widens base portions of lead electrodes included in inner electrode layers in order to reduce its equivalent series inductance (ESL). Therefore, there is a fear of this multilayer capacitor lowering its equivalent series resistance in excess.

It is an object of the present invention to provide a multilayer capacitor which can easily regulate its equivalent series resistance.

Meanwhile, inner electrode layers in typical multilayer capacitors are connected to their corresponding terminal electrodes through lead electrodes. Therefore, as the number of inner electrode layers increases, the number of lead electrodes becomes greater, thereby lowering the equivalent series resistance. When the number of laminated dielectric layers and inner electrode layers is made greater in order to increase the capacitance of a multilayer capacitor, the number of lead electrodes also increases. Since resistance components of lead electrodes are connected in parallel to terminal electrodes, the equivalent series resistance further decreases as the number of lead electrodes increases. Thus, the demand for increasing the capacitance of the capacitor and the demand for increasing the equivalent series resistance contradict each other.

Therefore, the inventors diligently conducted studies about multilayer capacitors which can satisfy both of the demands for increasing the capacitance and equivalent series resistance, and have noticed that the equivalent series resistance can be made greater when lead electrodes are elongated even if the number of laminated dielectric layers and inner electrode layers is the same. However, simply elongating the lead electrode makes the multilayer body bulky. As a consequence, the inventors have found a new fact that, when an electrode portion forming a capacitance component is provided with a portion also functioning as a lead electrode, the portion equivalent of a lead electrode becomes substantially long and can restrain the equivalent series resistance from decreasing in excess. The inventors have also found a new fact that the equivalent series resistance can be adjusted to a desirable value depending on the length of the above-mentioned portion also functioning as a lead electrode.

In view of such results of studies, in one aspect, the present invention provides a multilayer capacitor comprising a multilayer body in which a plurality of dielectric layers and a plurality of inner electrode layers are alternately laminated, and a plurality of terminal electrodes formed on the multilayer body; wherein the plurality of inner electrode layers include first and second inner electrode layers alternately arranged; wherein the plurality of terminal electrodes include first and second terminal electrodes electrically insulated from each other; wherein the first inner electrode layer includes a first lead electrode connected to the first terminal electrode and a first capacitor electrode forming a capacitance component; wherein the second inner electrode layer includes a second lead electrode connected to the second terminal electrode and a second capacitor electrode forming a capacitance component; wherein the first capacitor electrode is provided with a pair of slits extending from a periphery corresponding to the first lead electrode, and a potion of the first capacitor electrode positioned between the pair of slits is continuous with the first lead electrode; and wherein the second capacitor electrode is provided with a pair of slits extending from a periphery corresponding to the second lead electrode and a portion of the second capacitor electrode positioned between the pair of slits is continuous with the second lead electrode.

In view of the above-mentioned results of studies, in another aspect, the present invention provides a multilayer capacitor comprising a multilayer body in which a plurality of dielectric layers and a plurality of inner electrode layers are alternately laminated, and a plurality of terminal electrodes formed on the multilayer body; wherein the plurality of inner electrode layers include a plurality of first inner electrode layers and a plurality of second inner electrode layers alternately arranged; wherein the plurality of terminal electrodes include a plurality of first terminal electrodes and a plurality of second terminal electrodes electrically insulated from each other; wherein the first inner electrode layer includes a first lead electrode connected to one of the plurality of first terminal electrodes and a first capacitor electrode forming a capacitance component; wherein the second inner electrode layer includes a second lead electrode connected to one of the plurality of second terminal electrodes and a second capacitor electrode forming a capacitance component; wherein the first capacitor electrode is provided with a pair of slits extending from a periphery corresponding to the first lead electrode and a portion of the first capacitor electrode positioned between the pair of slits is continuous with the first lead electrode; and wherein the second capacitor electrode is provided with a pair of slits extending from a periphery corresponding to the second lead electrode and a portion of the second capacitor electrode positioned between the pair of slits is continuous with the second lead electrode.

In view of the above-mentioned results of studies, in still another aspect, the present invention provides a multilayer capacitor comprising a multilayer body in which a plurality of dielectric layers and a plurality of inner electrode layers are alternately laminated, and a plurality of terminal electrodes formed on the multilayer body; wherein the plurality of inner electrode layers include a plurality of first inner electrode layers and a plurality of second inner electrode layers alternately arranged; wherein the plurality of terminal electrodes include a plurality of first terminal electrodes and a plurality of second terminal electrodes electrically insulated from each other, wherein the first inner electrode layer includes a plurality of first lead electrodes respectively connected to the plurality of first terminal electrodes and a first capacitor electrode forming a capacitance component; wherein the second inner electrode layer includes a plurality of second lead electrodes respectively connected to the plurality of second terminal electrodes and a second capacitor electrode forming a capacitance component; wherein the first capacitor electrode is provided with a plurality of pairs of slits extending from respective peripheries corresponding to the first lead electrodes and respective portions of the first capacitor electrode positioned between the respective pairs of slits are continuous with the corresponding first lead electrodes; and wherein the second capacitor electrode is provided with a plurality of pairs of slits extending from respective peripheries corresponding to the second lead electrodes and respective portions of the second capacitor electrode positioned between the respective pairs of slits are continuous with the corresponding second lead electrodes.

In each of the multilayer capacitors in accordance with these aspects of the present invention, the portion positioned between a pair of slits in each of the first and second capacitor electrodes functions as an electrode portion forming a capacitance component and also as a lead electrode. Therefore, portions corresponding to lead electrodes in the first and second inner electrode layers are substantially elongated. As a consequence, these multilayer capacitors can increase the equivalent series resistance while securing the capacitance. By providing first and second capacitor electrodes with slits extending from peripheries corresponding to first and second lead electrodes, respectively, these multilayer capacitors regulate the equivalent series resistance. Therefore, these multilayer capacitors can regulate the equivalent series resistance easily.

Preferably, at least one of the respective portions of the first and second capacitor electrodes positioned between the pairs of slits has a meandering or crank-shaped form. In this case, the portion corresponding to a lead electrode in at least one of the first and second inner electrode layers becomes further longer. Consequently, the value of equivalent series resistance can be made further greater.

Preferably, at least one of the first and second lead electrodes has an opening. In this case, at least one of the first and second lead electrodes decreases its area. As a consequence, the equivalent series resistance can be made further greater.

Preferably, at least one of the respective portions of the first and second capacitor electrodes positioned between the pairs of slits has an opening. In this case, the area corresponding to the lead electrode in at least one of the first and second inner electrode layers becomes smaller. As a consequence, the equivalent series resistance can be made further greater.

Preferably, the portion of the first capacitor electrode positioned between the pair of slits has a width set narrower on the rest side than on the side connected to the first lead electrode. In this case, a resistance of the portion of the first capacitor electrode positioned between a pair of slits becomes relatively large, whereby the value of equivalent series resistance can be made further greater.

Preferably, the portion of the second capacitor electrode positioned between the pair of slits has a width set narrower on the rest side than on the side connected to the second lead electrode. In this case, a resistance of the portion of the second capacitor electrode positioned between a pair of slits becomes relatively large, whereby the value of equivalent series resistance can be made further greater.

Preferably, an equivalent series resistance is set to a desirable value by regulating a length of the slits. In this case, the length of the portion positioned between a pair of slits is regulated, whereby a multilayer capacitor having a desirable value of equivalent series resistance can be obtained easily.

The present invention can provide a multilayer capacitor which can easily regulate the equivalent series resistance.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

In the following, preferred embodiments of the present invention will be explained in detail with reference to the accompanying drawings. In the explanation, constituents identical to each other or those having functions identical to each other will be referred to with numerals identical to each other without repeating their overlapping descriptions. Though FIGS. 3 to 16 omit XYZ coordinates, the coordinates used in the following explanation are the same as those shown in FIG. 2.

First Embodiment

Figure 1:
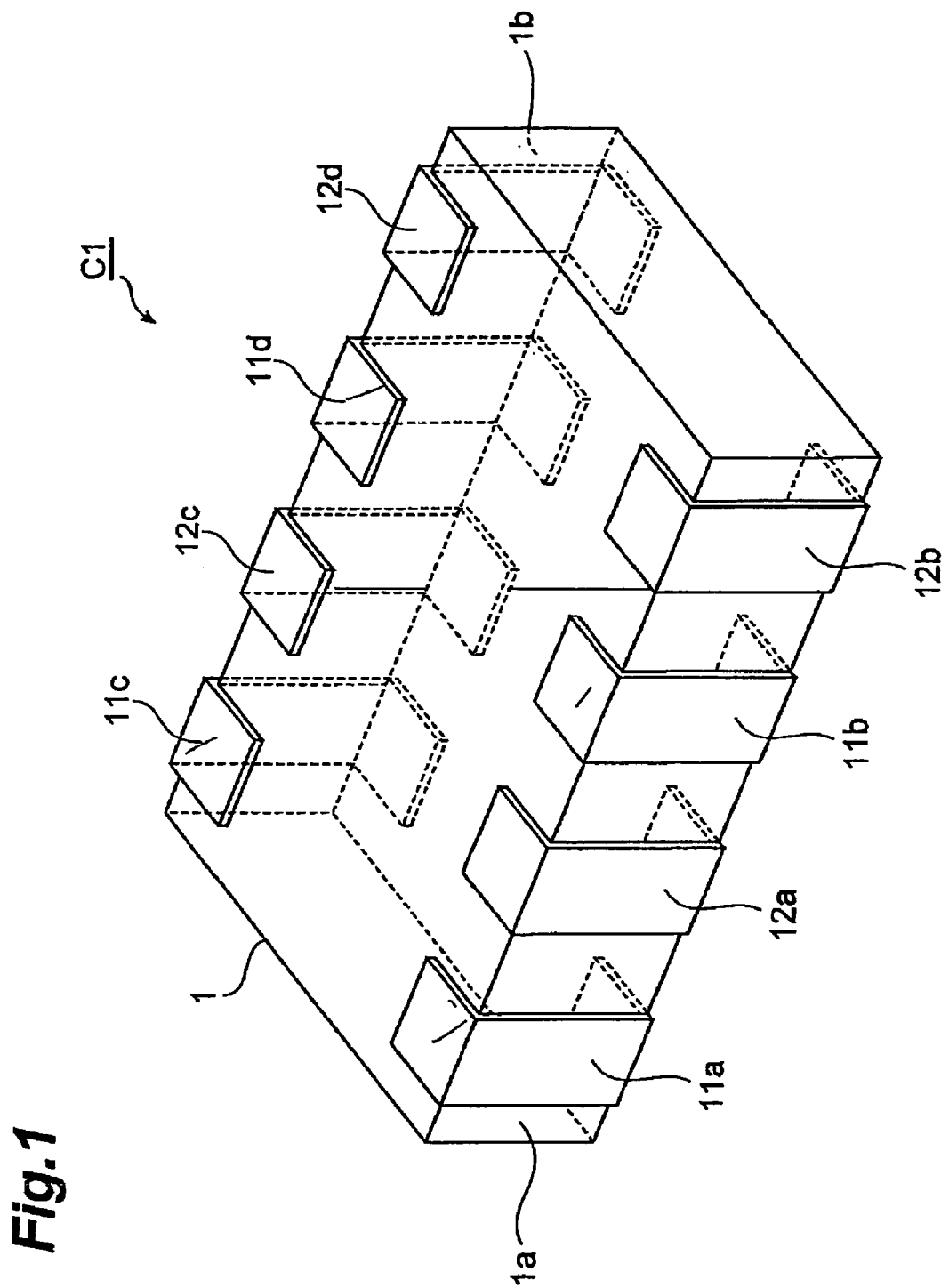
FIG. 1 is a perspective view of the multilayer capacitor in accordance with a first embodiment.
Figure 2:
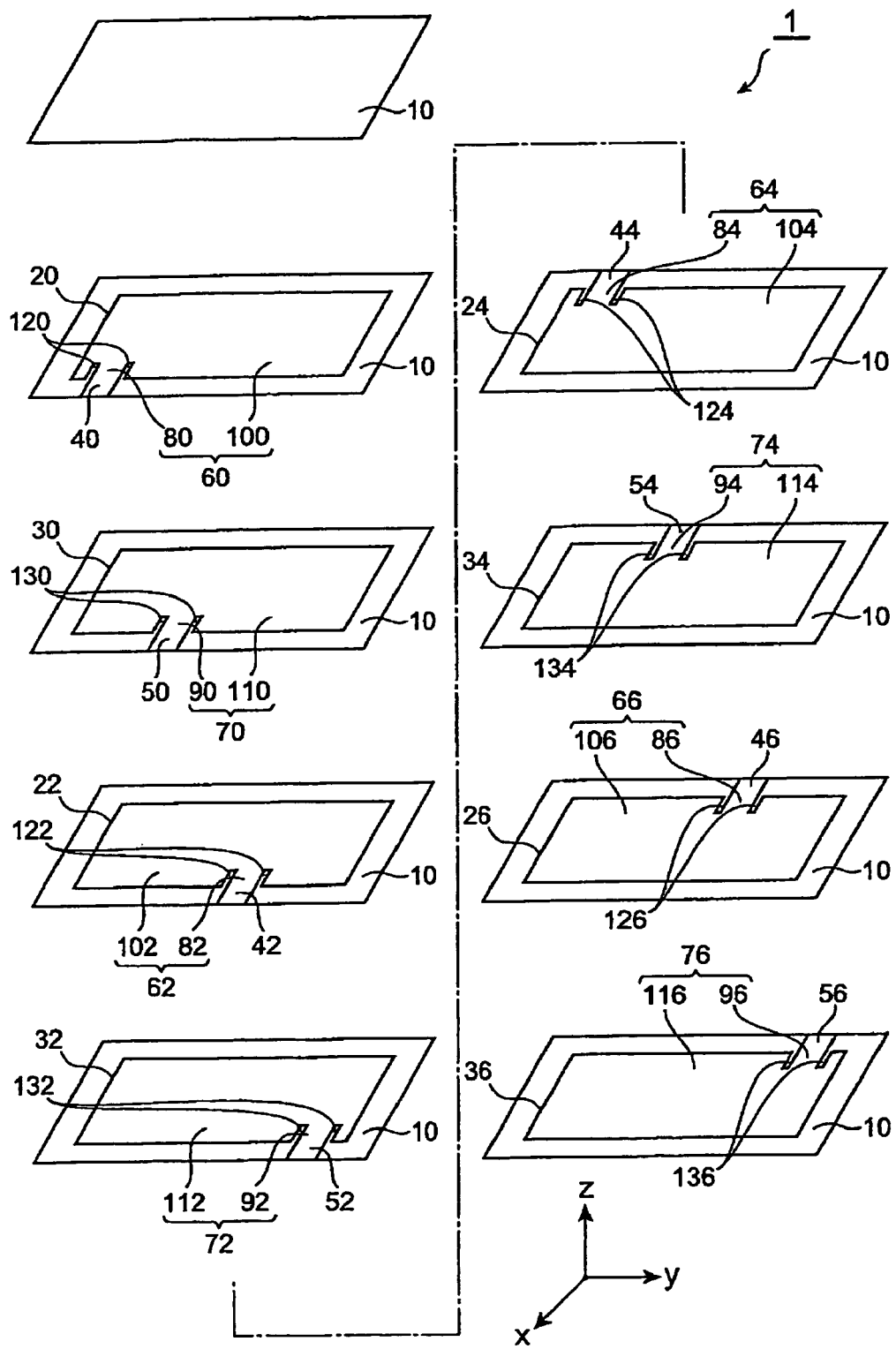
FIG. 2 is an exploded perspective view of the multilayer body included in the multilayer capacitor in accordance with the first embodiment.

With reference to FIGS. 1 and 2, the structure of the multilayer capacitor C1 in accordance with a first embodiment will be explained. FIG. 1 is a perspective view of the multilayer capacitor in accordance with the first embodiment. FIG. 2 is an exploded perspective view of the multilayer body included in the multilayer capacitor in accordance with the first embodiment.

As shown in FIG. 1, the multilayer capacitor C1 comprises a multilayer body 1, and first and second terminal electrodes 11a to 11d, 12a to 12d which are formed on the multilayer body 1.

The first and second terminal electrodes 11a to 11d, 12a to 12d are provided four by four, and are electrically insulated from each other. Among the four first terminal electrodes 11a, 11b, 11c, 11d, two first terminal electrodes 11a and 11b are positioned on a side face 1a of the multilayer body 1, whereas the remaining two first terminal electrodes 11c and 11d are positioned on a side face 1b of the multilayer body 1 opposing the side face 1a. On the other hand, among the four second terminal electrodes 12a, 12b, 12c, 12d, two second terminal electrodes 12a and 12b are positioned on the side face 1a of the multilayer body 1, whereas the remaining two first terminal electrodes 12c and 12d are positioned on the side face 1b of the multilayer body 1. On each of the side faces 1a, 1b, the first and second terminal electrodes 11a to 11d, 12a to 12d are alternately arranged. Namely, the first terminal electrode 11a, second terminal electrode 12a, first terminal electrode 11b, and second terminal electrode 12b are arranged in this order on the side face 1a, whereas the first terminal electrode 11c, second terminal electrode 12c, first terminal electrode 11d, and second terminal electrode 12d are arranged in this order on the side face 1b.

As is also shown in FIG. 2, the multilayer body 1 is constructed by alternately laminating a plurality of (9 in this embodiment) dielectric layers 10 with a plurality of (4 each in this embodiment) first and second inner electrodes 20, 22, 24, 26, 30, 32, 34, 36. In the actual multilayer capacitor C1, the dielectric layers 10 are integrated to such an extent that no boundaries are discernible therebetween.

The first inner electrode layers 20 to 26 include first lead electrodes 40, 42, 44, 46 and first capacitor electrodes 60, 62, 64, 66. The first lead electrodes 40 to 46 are connected to their corresponding one of the first terminal electrodes 11a to 11d. The first lead electrodes 40 to 46, each having a rectangular form, extend from their corresponding first capacitor electrodes 60 to 66 so as to be taken out to one of the two side faces 1a, 1b of the multilayer body 1 formed with the first terminal electrodes 11a to 11d. Specifically, the first lead electrode 40 in the first inner electrode layer 20 is taken out to the side face 1a of the multilayer body 1 so as to connect with the first terminal electrode 11a. The first lead electrode 42 in the first inner electrode layer 22 is taken out to the side face 1a of the multilayer body 1 so as to connect with the first terminal electrode 11b. The first lead electrode 44 in the first inner electrode layer 24 is taken out to the side face 1b of the multilayer body 1 so as to connect with the first terminal electrode 11c. The first lead electrode 46 in the first inner electrode layer 26 is taken out to the side face 1b of the multilayer body 1 so as to connect with the first terminal electrode 11d.

The second inner electrode layers 30 to 36 include second lead electrodes 50, 52, 54, 56 and second capacitor electrodes 70, 72, 74, 76. The second lead electrodes 50 to 56 are connected to their corresponding one of the second terminal electrodes 12a to 12d. The second lead electrodes 50 to 56, each having a rectangular form, extend from their corresponding second capacitor electrodes 70 to 76 so as to be taken out to one of the two side faces 1a, 1b of the multilayer body 1 formed with the second terminal electrodes 12a to 12d. Specifically, the second lead electrode 50 in the second inner electrode layer 30 is taken out to the side face 1a of the multilayer body 1 so as to connect with the second terminal electrode 12a. The second lead electrode 52 in the second inner electrode layer 32 is taken out to the side face 1a of the multilayer body 1 so as to connect with the second terminal electrode 12b. The second lead electrode 54 in the second inner electrode layer 34 is taken out to the side face 1b of the multilayer body 1 so as to connect with the second terminal electrode 11c. The second lead electrode 56 in the second inner electrode layer 36 is taken out to the side face 1b of the multilayer body 1 so as to connect with the second terminal electrode 12d.

The first lead electrodes 40, 42 and second lead electrodes 50, 52 are shifted from each other in the Y direction in FIG. 2. Namely, the first lead electrode 40, second lead electrode 50, first lead electrode 42, and second lead electrode 52 are successively shifted in the +Y direction. The first lead electrodes 44, 46 and second lead electrodes 54, 56 are shifted from each other in the Y direction in FIG. 2. Namely, the first lead electrode 44, second lead electrode 54, first lead electrode 46, and second lead electrode 56 are successively shifted in the +Y direction. In FIGS. 2 to 17, for convenience of explanation, the Z axis is assumed to be the laminating direction of the dielectric layers and inner electrode layers in the multilayer body, the Y axis is assumed to be a direction which is perpendicular to the Z axis and is parallel to side faces of the multilayer body where the first and second terminal electrodes are positioned, and the X axis is assumed to be a direction perpendicular to the Z and Y axes.

The first capacitor electrodes 60 to 66 forming a capacitance component of the capacitor are formed at respective positions separated by a predetermined distance from each of side faces of the multilayer body 1 parallel to the Z axis. The first capacitor electrodes 60 to 66 include their corresponding first capacitor lead electrodes 80, 82, 84, 86 and first capacitor main electrodes 100, 102, 104, 106.

As shown in FIG. 2, the first capacitor lead electrodes 80 to 86 are formed so as to be continuous with their corresponding first lead electrodes 40 to 46 by respective pairs of slits 120, 122, 124, 126 formed in the first capacitor electrodes 60 to 66. The respective slits 120 to 126 are narrow rectangular incisions formed so as to extend along the X axis from both ends in the direction of Y-axis where the first lead electrodes 40 to 46 connect with their corresponding first capacitor electrodes 60 to 66. The first capacitor lead electrode 80 is formed continuous with the first lead electrode 40 by the slits 120. The first capacitor lead electrode 82 is formed continuous with the first lead electrode 42 by the slits 122. The first capacitor lead electrode 84 is formed continuous with the first lead electrode 44 by the slits 124. The first capacitor lead electrode 86 is formed continuous with the first lead electrode 46 by the slits 126. As shown in FIG. 2, the first capacitor main electrodes 100 to 106 are formed so as to be separated from their corresponding first lead electrodes 40 to 46 by the respective pairs of slits 120 to 126. In this embodiment, the first capacitor lead electrodes 80 to 86 are positioned between their corresponding pairs of slits 120 to 126. The pairs of slits 120 to 126 extend from respective peripheries corresponding to the first lead electrodes 40 to 46 in the first capacitor electrodes 60 to 66. The first capacitor main electrodes 100 to 106 are the remainder (i.e., the rest) of the first capacitor electrodes 60 to 66 with respect to the first capacitor lead electrodes 80 to 86.

The second capacitor electrodes 70 to 76 forming a capacitance component of the capacitor are formed at respective positions separated by a predetermined distance from each of side faces of the multilayer body parallel to the Z axis. The second capacitor electrodes 70 to 76 include their corresponding second capacitor lead electrodes 90, 92, 94, 96 and second capacitor main electrodes 110, 112, 114, 116.

As shown in FIG. 2, the second capacitor lead electrodes 90 to 96 are formed so as to be continuous with their corresponding second lead electrodes 50 to 56 by respective pairs of slits 130, 132, 134, 136 formed in the second capacitor electrodes 70 to 76. The slits 130 to 136 are narrow rectangular incisions formed so as to extend along the X axis from both ends in the direction of Y-axis where the second lead electrodes 50 to 56 connect with their corresponding second capacitor electrodes 70 to 76. The second capacitor lead electrode 90 is formed continuous with the second lead electrode 50 by the slits 130. The second capacitor lead electrode 92 is formed continuous with the second lead electrode 52 by the slits 132. The second capacitor lead electrode 94 is formed continuous with the second lead electrode 54 by the slits 134. The second capacitor lead electrode 96 is formed continuous with the second lead electrode 56 by the slits 136. As shown in FIG. 2, the second capacitor main electrodes 110 to 116 are formed so as to be separated from their corresponding second lead electrodes 50 to 56 by respective pairs of slits 130 to 136. In this embodiment, the second capacitor lead electrodes 90 to 96 are positioned between their corresponding pairs of slits 130 to 136. The pairs of slits 130 to 136 extend from respective peripheries corresponding to the second lead electrodes 50 to 56 in the second capacitor electrodes 70 to 76. The second capacitor main electrodes 110 to 116 are the remainder (i.e., the rest) of the second capacitor electrodes 70 to 76 with respect to the second capacitor lead electrodes 90 to 96.

The first capacitor electrodes 60 to 66 and the second capacitor electrodes 70 to 76 align with each other in the Z-axis direction.

As shown in FIG. 2, the first and second capacitor lead electrodes 80 to 86, 90 to 96 are formed continuous with the first and second lead electrodes 40 to 46, 50 to 56 by the slits 120 to 126, 130 to 136, respectively. Therefore, in the inner electrode layers, the first and second capacitor lead electrodes 80 to 86, 90 to 96 can function as lead electrodes connecting their corresponding terminal electrodes to capacitor electrodes forming a capacitance component. Consequently, portions substantially functioning as lead electrodes for the first and second inner electrode layers 20 to 26, 30 to 36 are portions formed by both the first and second lead electrodes 40 to 46, 50 to 56 and first and second capacitor lead electrodes 80 to 86, 90 to 96, respectively. Hence, the portions substantially corresponding to lead electrodes for the first and second inner electrode layers 20 to 26, 30 to 36 become longer than in the case without the slits 120 to 126, 130 to 136, whereby the multilayer capacitor C1 yields a greater equivalent series resistance.

As shown in FIG. 2, the first capacitor lead electrodes 80 to 86 align with the second capacitor electrodes 70 to 76 in the Z-axis direction, thereby forming a capacitance component. As shown in FIG. 2, the second capacitor lead electrodes 90 to 96 align with the first capacitor electrodes 60 to 66 in the Z-axis direction, thereby forming a capacitance component. Thus, the first and second capacitor lead electrodes 80 to 86, 90 to 96 can have not only a function as lead electrodes but also a function for forming a capacitance component of a capacitor. Therefore, the multilayer capacitor C1 can increase the equivalent series resistance while securing its capacitance.

The first and second capacitor lead electrodes 80 to 86, 90 to 96 are formed by their corresponding slits 120 to 126, 130 to 136, and vary their lengths depending on the respective lengths of the slits 120 to 126, 130 to 136 in the X-axis direction. Namely, the lengths of portions substantially functioning as lead electrodes can be changed by the slits 120 to 126, 130 to 136 formed in the first and second capacitor electrodes 60 to 66, 70 to 76, whereby the equivalent series resistance can be altered. Thus, the multilayer capacitor C1 can change the value of equivalent series resistance by altering the lengths of the slits 120 to 126, 130 to 136, and thus can easily regulate the equivalent series resistance.

Since the multilayer capacitor C1 can change the value of equivalent series resistance by simply altering the lengths of the slits 120 to 126, 130 to 136, the equivalent series resistance of the multilayer capacitor C1 can be set to a desirable value depending on the lengths of the slits 120 to 126, 130 to 136. Thus, a multilayer capacitor having a desirable value of equivalent series resistance can be obtained.

Second Embodiment

Figure 3:
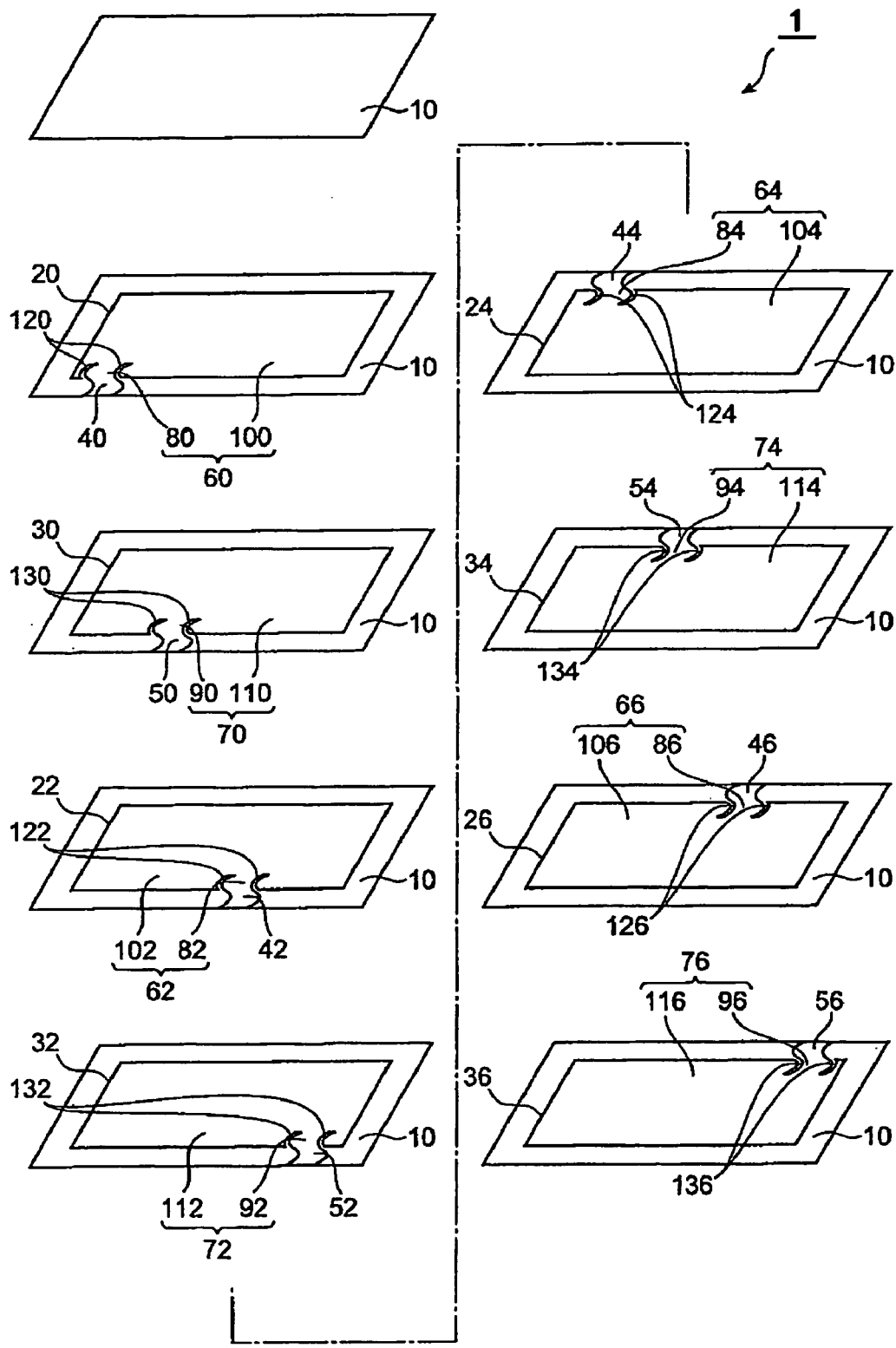
FIG. 3 is an exploded perspective view of the multilayer body included in the multilayer capacitor in accordance with a second embodiment.

The structure of the multilayer capacitor in accordance with a second embodiment will be explained with reference to FIG. 3. The multilayer capacitor in accordance with the second embodiment differs from the multilayer capacitor in accordance with the first embodiment in terms of the form of capacitor lead electrodes. FIG. 3 is an exploded perspective view of the multilayer body 1 included in the multilayer capacitor in accordance with the second embodiment.

In the multilayer body 1, as shown in FIG. 3, each of first and second capacitor lead electrodes 80 to 86, 90 to 96 has a meandering form. Each of first and second lead electrodes 40 to 46, 50 to 56 continuous with corresponding one of the first and second capacitor lead electrodes 80 to 86, 90 to 96 also has a meandering form.

In the multilayer capacitor in accordance with this embodiment, as in the foregoing, portions substantially corresponding to lead electrodes for the first and second inner electrode layers 20 to 26, 30 to 36 become longer. Therefore, as in the multilayer capacitor in accordance with the first embodiment, the equivalent series resistance can be made greater while securing a capacitance.

In particular, the multilayer capacitor in accordance with the second embodiment elongates the first and second capacitor lead electrodes 80 to 86, 90 to 96, which also function as lead electrodes, by making them meander. As a result, portions substantially corresponding to lead electrodes for the first and second inner electrode layers 20 to 26, 30 to 36 become longer, whereby the value of equivalent series resistance can be made greater.

As with the multilayer capacitor in accordance with the first embodiment, the multilayer capacitor in accordance with the second embodiment can change the value of equivalent series resistance by simply altering respective lengths of slits 120 to 126, 130 to 136, and thus can easily regulate the equivalent series resistance. Further, the equivalent series resistance of the multilayer capacitor can be set to a desirable value depending on the respective lengths of the slits 120 to 126, 130 to 136, whereby a multilayer capacitor having a desirable value of equivalent series resistance can be obtained.

The first and second lead electrodes 40 to 46, 50 to 56 may have rectangular forms, for example, instead of meandering forms. It is not necessary for all of the first and second capacitor lead electrodes 80 to 86, 90 to 96 to have meandering forms. For example, it will be sufficient if one of species of the first and second capacitor lead electrodes 80 to 86, 90 to 96 have a meandering form. Alternatively, for example, it will be sufficient if a portion of the first capacitor lead electrodes 80 to 86 has a meandering form.

Figure 4:
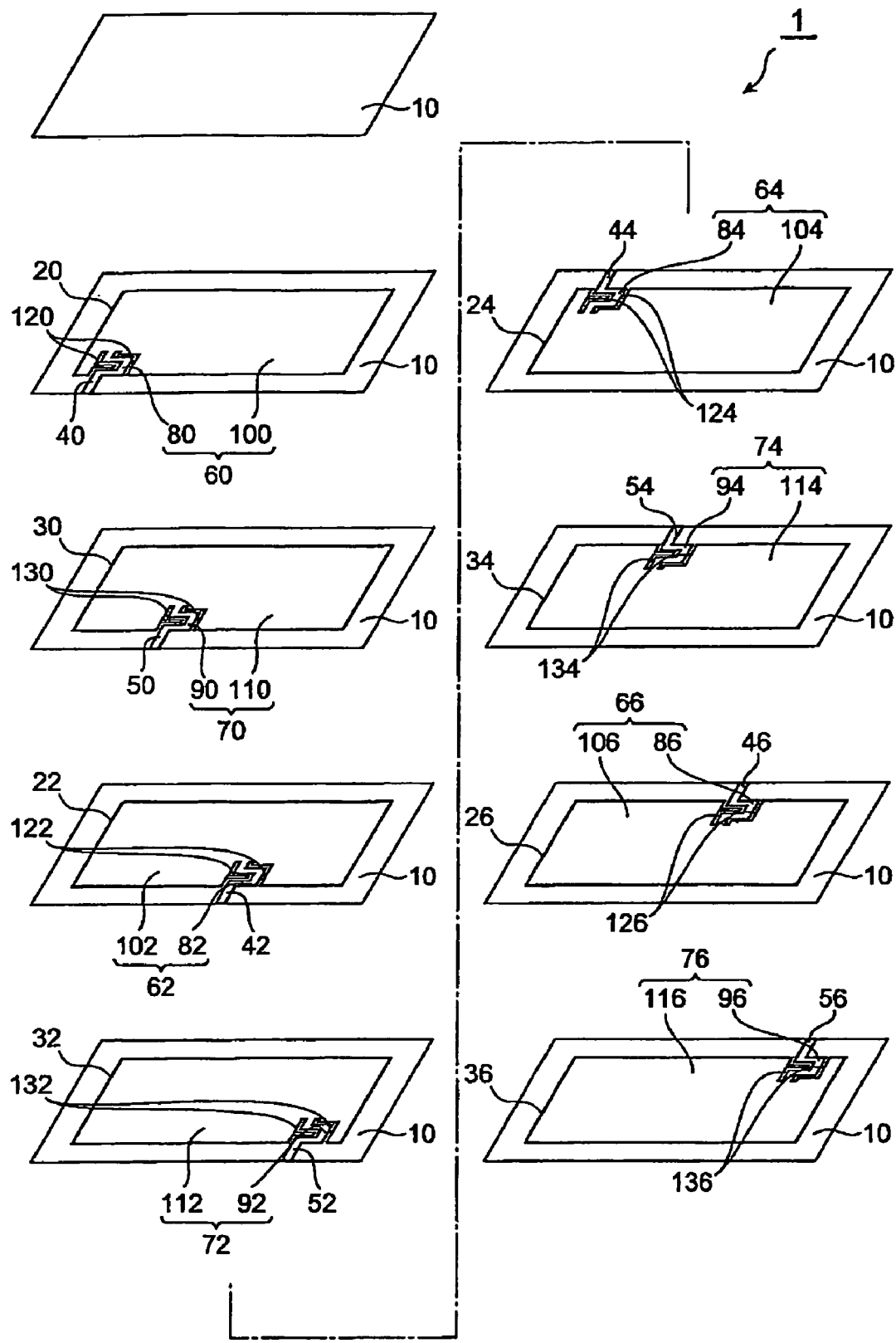
FIG. 4 is an exploded perspective view of the multilayer body included in a modified example of the multilayer capacitor in accordance with the second embodiment.

The first and second capacitor lead electrodes 80 to 86, 90 to 96 and the first and second lead electrodes 40 to 46, 50 to 56 may have crank-shaped forms as shown in FIG. 4.

Third Embodiment

Figure 5:
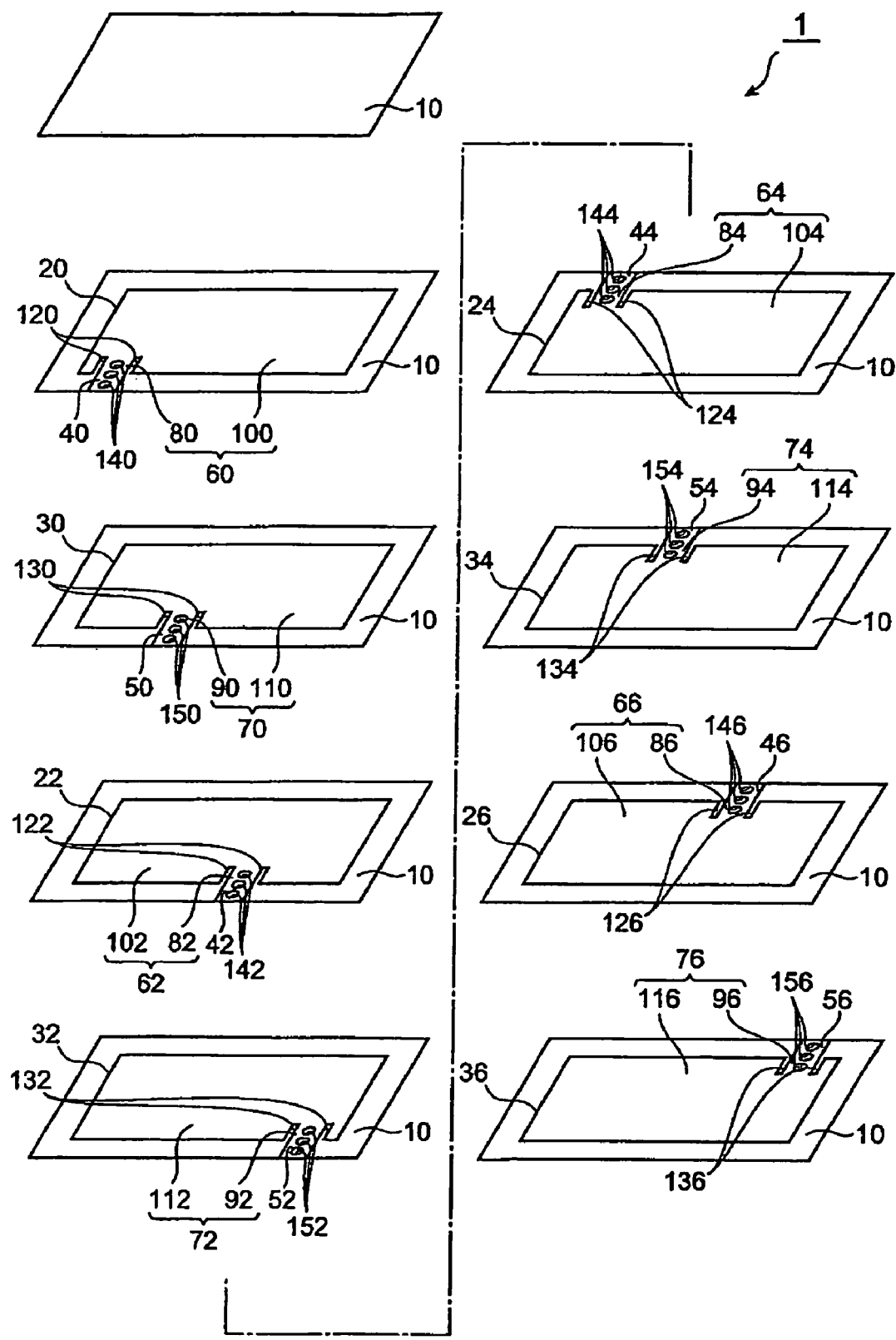
FIG. 5 is an exploded perspective view of the multilayer body included in the multilayer capacitor in accordance with a third embodiment.

With reference to FIG. 5, the structure of the multilayer capacitor in accordance with a third embodiment will be explained. The multilayer capacitor in accordance with the third embodiment differs from the multilayer capacitor in accordance with the first embodiment in that capacitor lead electrodes or lead electrodes have openings. FIG. 5 is an exploded perspective view of the multilayer body 1 included in the multilayer capacitor in accordance with the third embodiment.

In the multilayer body 1, as shown in FIG. 5, first and second lead electrodes 40 to 46, 50 to 56 and first and second capacitor lead electrodes 80 to 86, 90 to 96 have circular openings 140, 142, 144, 146, 150, 152, 154, 156. The openings 140 to 146 are formed by respective rows of three circular apertures aligning in the X-axis direction in portions where the first lead electrodes 40 to 46 are continuous with their corresponding first capacitor lead electrodes 80 to 86. The openings 150 to 156 are formed by respective rows of three circular apertures aligning in the X-axis direction in portions where the second lead electrodes 50 to 56 are continuous with their corresponding second capacitor lead electrodes 90 to 96.

In the multilayer capacitor in accordance with this embodiment, as in the foregoing, portions substantially corresponding to lead electrodes for the first and second inner electrode layers 20 to 26, 30 to 36 become longer. Therefore, as in the multilayer capacitor in accordance with the first embodiment, the equivalent series resistance can be made greater while securing a capacitance.

In particular, since the first and second capacitor lead electrodes 80 to 86, 90 to 96 and first and second lead electrodes 40 to 46, 50 to 56 have the openings 140 to 146, 150 to 156, the multilayer capacitor in accordance with the third embodiment reduces the area of portions substantially corresponding to lead electrodes. As a result, the value of equivalent series resistance can be made greater.

As with the multilayer capacitor in accordance with the first embodiment, the multilayer capacitor in accordance with the third embodiment can change the value of equivalent series resistance by simply altering respective lengths of slits 120 to 126, 130 to 136, and thus can easily regulate the equivalent series resistance. Further, the equivalent series resistance of the multilayer capacitor can be set to a desirable value depending on the respective lengths of the slits 120 to 126, 130 to 136, whereby a multilayer capacitor having a desirable value of equivalent series resistance can be obtained.

It is not necessary for all the portions of the first and second lead electrodes 40 to 46, 50 to 56 and the first and second capacitor lead electrodes 80 to 86, 90 to 96 to have openings. It will be sufficient if a portion of them has an opening. For example, the first and second lead electrodes 40 to 46, 50 to 56, which are one of two species of the first and second lead electrodes 40 to 46, 50 to 56 and first and second capacitor lead electrodes 80 to 86, 90 to 96, may have openings alone. Alternatively, for example, the first capacitor lead electrodes 80 to 86 may have openings alone.

Figure 6:
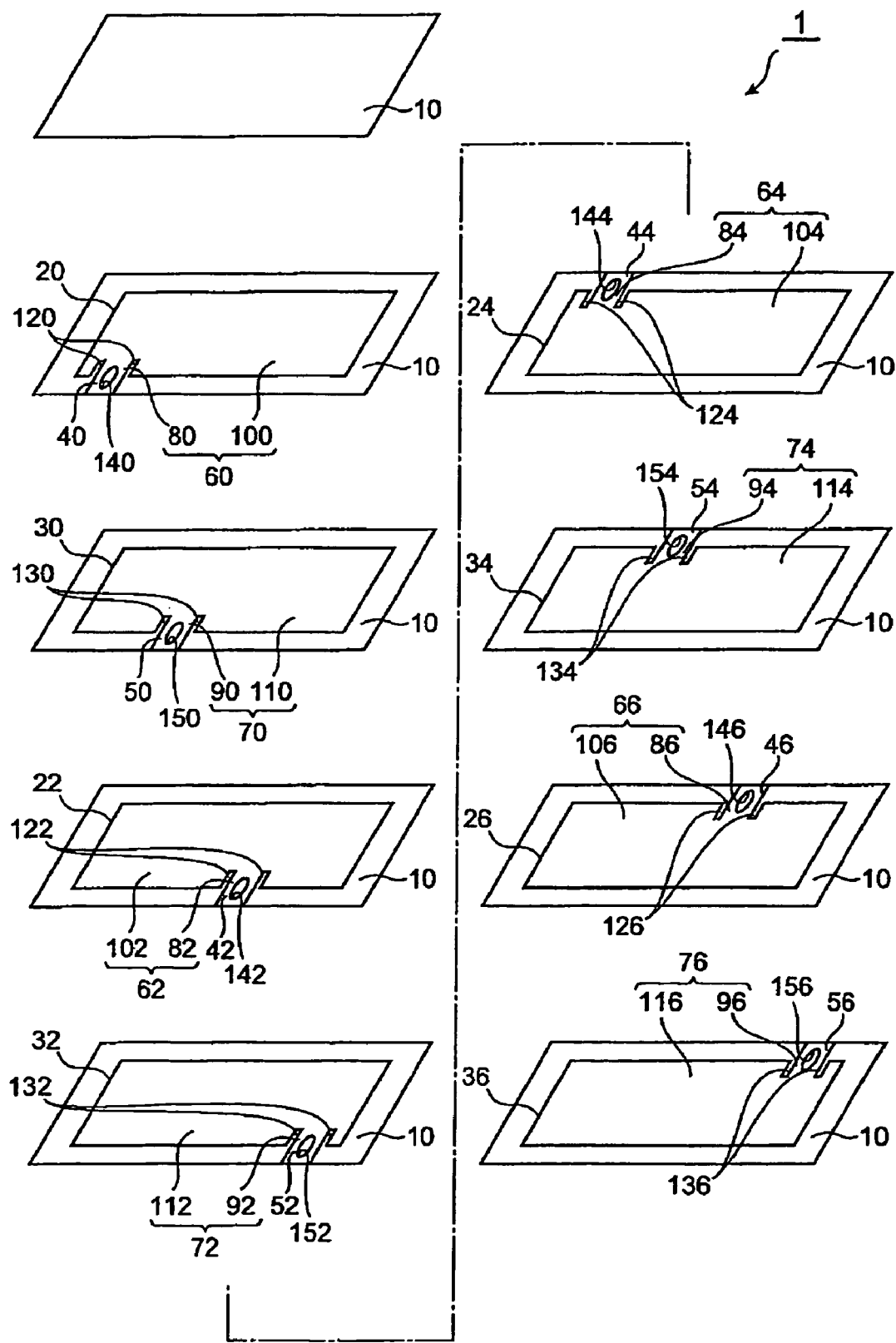
FIG. 6 is an exploded perspective view of the multilayer body included in a modified example of the multilayer capacitor in accordance with the third embodiment.
Figure 7:
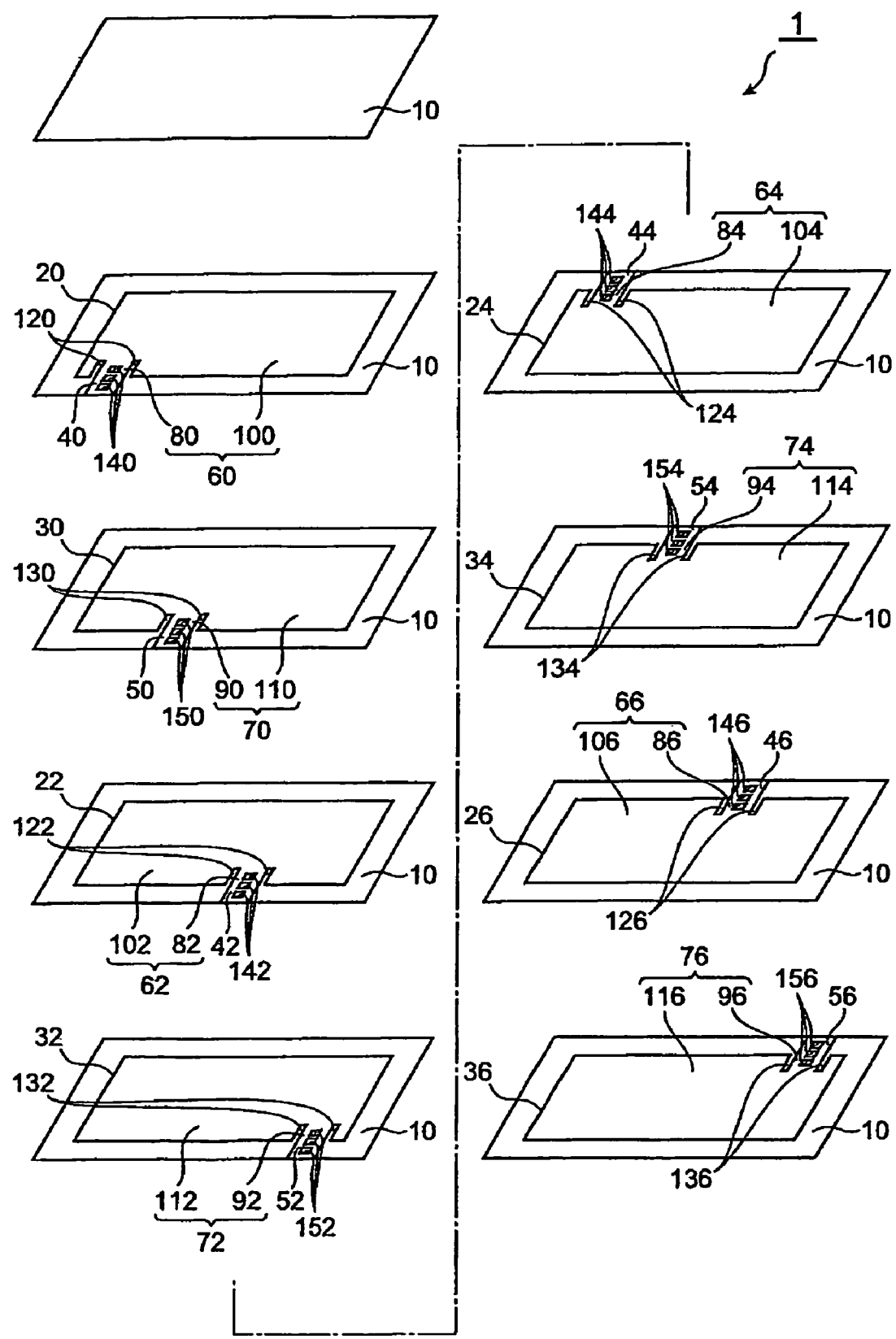
FIG. 7 is an exploded perspective view of the multilayer body included in a modified example of the multilayer capacitor in accordance with the third embodiment.
Figure 8:
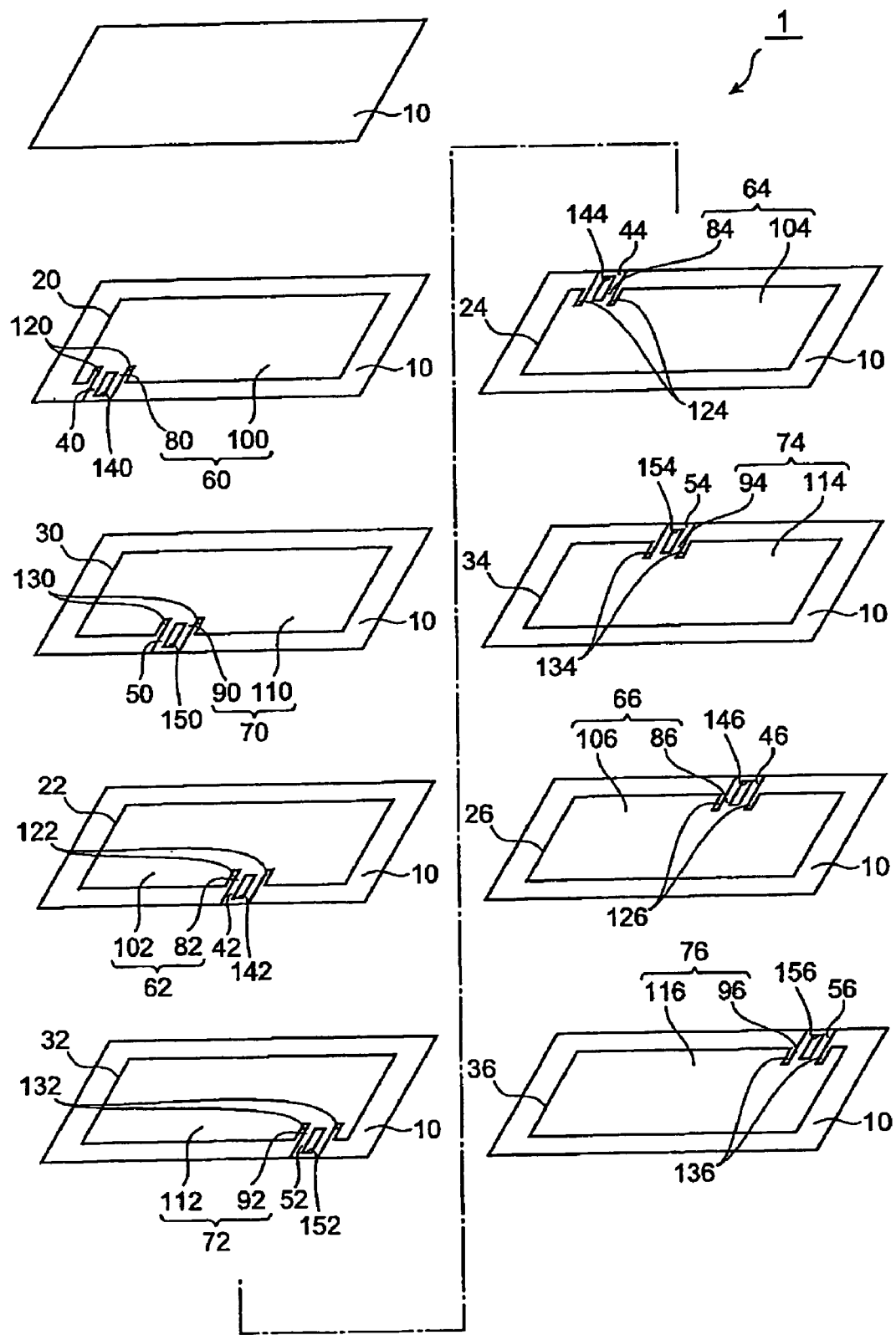
FIG. 8 is an exploded perspective view of the multilayer body included in a modified example of the multilayer capacitor in accordance with the third embodiment.

The openings 140 to 146, 150 to 156 are not limited to those having circular forms as shown in FIG. 5. For example, as shown in FIG. 6, each of the openings 140 to 146, 150 to 156 may be a single elliptical aperture elongated in the X-axis direction. Alternatively, as shown in FIG. 7, each of the openings 140 to 146, 150 to 156 may be constituted by a row of tree rectangular apertures aligning in the X-axis direction. Alternatively, as shown in FIG. 8, each of the openings 140 to 146, 150 to 156 may have a rectangular form elongated in the X-axis direction.

Fourth Embodiment

Figure 9:
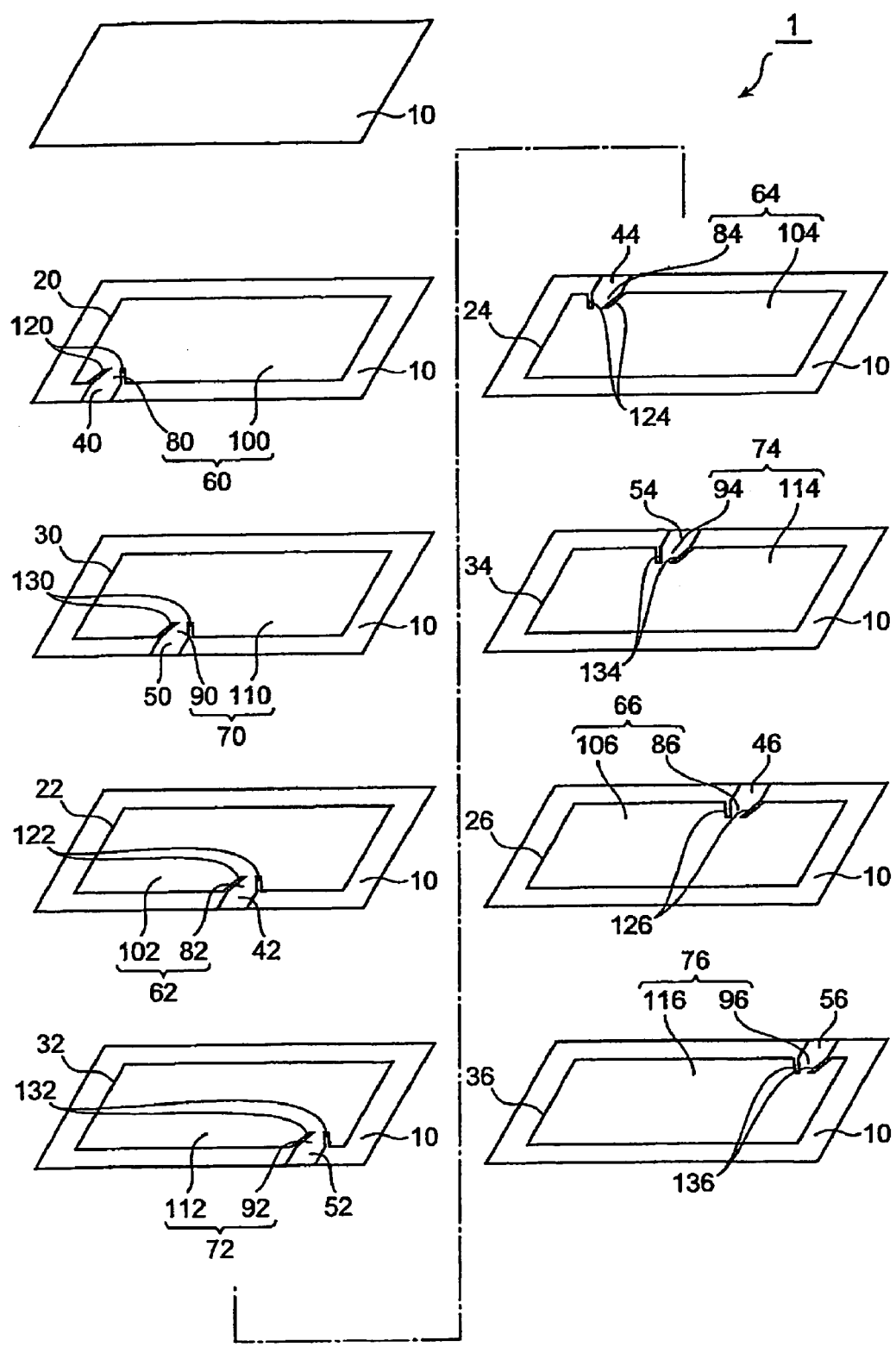
FIG. 9 is an exploded perspective view of the multilayer body included in the multilayer capacitor in accordance with a fourth embodiment.

The structure of the multilayer capacitor in accordance with a fourth embodiment will be explained with reference to FIG. 9. The multilayer capacitor in accordance with the fourth embodiment differs from the multilayer capacitor in accordance with the first embodiment in terms of the form of capacitor lead electrodes. FIG. 9 is an exploded perspective view of the multilayer body 1 included in the multilayer capacitor in accordance with the fourth embodiment.

As shown in FIG. 9, in terms of the width that is perpendicular to the direction in which a plurality of dielectric layers 10 and a plurality of inner electrodes 20 to 26, 30 to 36 are laminated and is parallel to side faces 1a, 1b of the multilayer body 1 to which the first and second lead electrodes 40 to 46, 50 to 56 are taken out, first and second capacitor lead electrodes 80 to 86, 90 to 96 in the multilayer body 1 are narrower in places where they connect with first and second capacitor main electrodes 100 to 106, 110 to 116 than in places where they connect with lead electrodes. Namely, as shown in FIG. 9, the width in the Y-axis direction of the first capacitor lead electrodes 80 to 86 is narrower in places connecting with the first capacitor main electrodes 100 to 106 than in places connecting with the first lead electrodes 40 to 46. In other words, the first capacitor lead electrodes 80 to 86 are set narrower on the side (i.e., the rest side) connected to the first capacitor main electrodes 100 to 106 than on the side connected to the first lead electrodes 40 to 46. The width in the Y-axis direction of the second capacitor lead electrodes 90 to 96 is narrower in places connecting with the second capacitor main electrodes 110 to 116 than in places connecting with the second lead electrodes 50 to 56. In other words, the second capacitor lead electrodes 90 to 96 are set narrower on the side (i.e., the rest side) connected to the second capacitor main electrodes 110 to 116 than on the side connected to the second lead electrodes 50 to 56.

In the multilayer capacitor in accordance with this embodiment, as in the foregoing, portions substantially corresponding to lead electrodes for the first and second inner electrode layers 20 to 26, 30 to 36 become longer. Therefore, as in the multilayer capacitor in accordance with the first embodiment, the equivalent series resistance can be made greater while securing a capacitance.

In particular, the width in the Y-axis direction of the first and second capacitor lead electrodes 80 to 86, 90 to 96 is narrower in the respective places connecting with the first and second capacitor main electrodes 100 to 106, 110 to 116 than in the respective places connecting with the first and second lead electrodes 40 to 46, 50 to 56 in the multilayer capacitor in accordance with the fourth embodiment.

As with the multilayer capacitor in accordance with the first embodiment, the multilayer capacitor in accordance with the fourth embodiment can change the value of equivalent series resistance by simply altering respective lengths of slits 120 to 126, 130 to 136, and thus can easily regulate the equivalent series resistance. Further, the equivalent series resistance of the multilayer capacitor can be set to a desirable value depending on the respective lengths of the slits 120 to 126, 130 to 136, whereby a multilayer capacitor having a desirable value of equivalent series resistance can be obtained.

It is not necessary for all of the first and second lead electrodes 80 to 86, 90 to 96 to have such a form as to change their width in the Y-axis direction. For example, it will be sufficient if one of two species of the first and second lead electrodes 80 to 86, 90 to 96 have such a form as to change their width in the Y-axis direction, while the other capacitor lead electrodes may be formed with a fixed width in the Y-axis direction.

Fifth Embodiment

Figure 10:
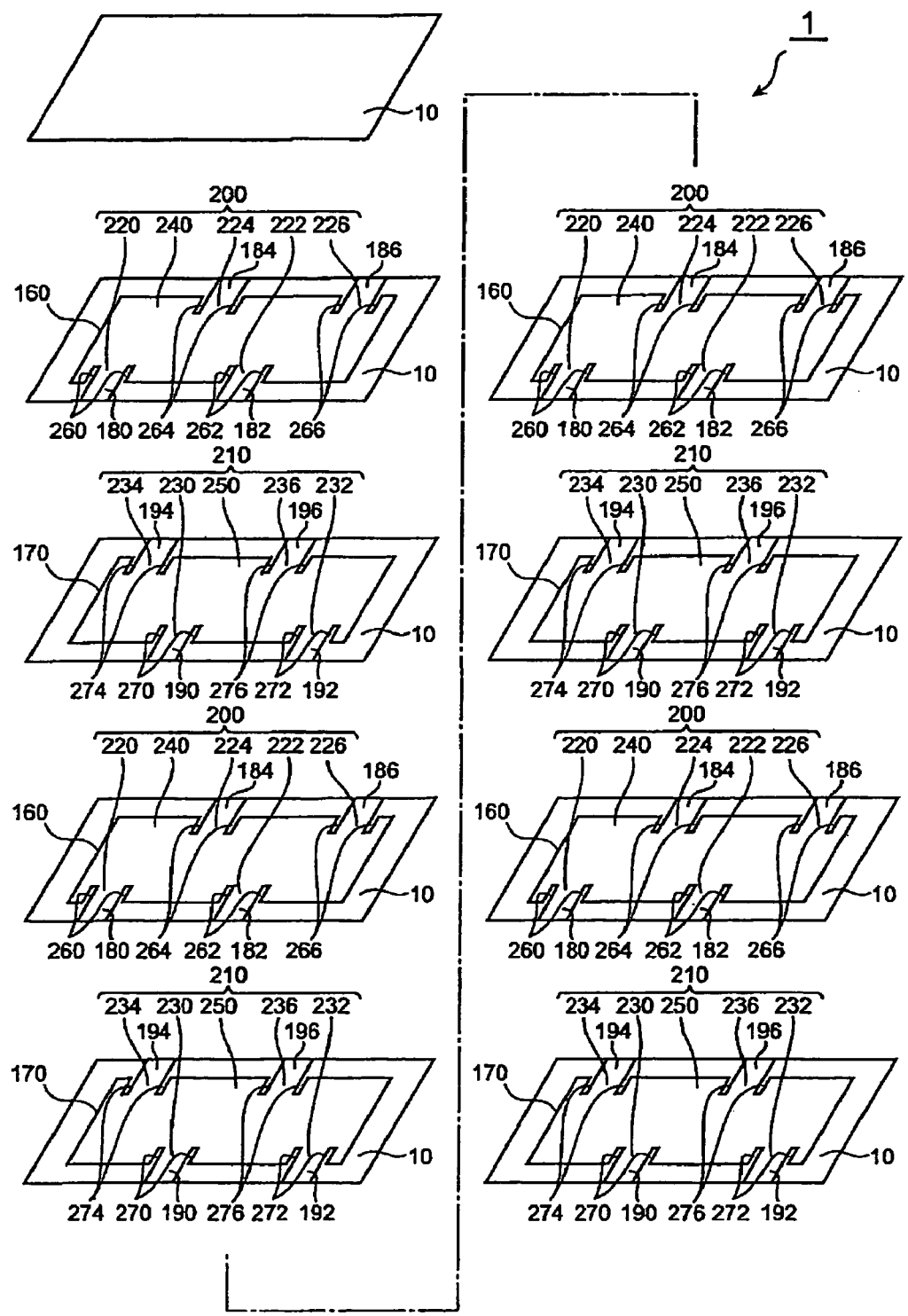
FIG. 10 is an exploded perspective view of the multilayer body included in the multilayer capacitor in accordance with a fifth embodiment.

With reference to FIG. 10, the structure of the multilayer capacitor in accordance with a fifth embodiment will be explained. The multilayer capacitor in accordance with the fifth embodiment differs from the multilayer capacitor in accordance with the first embodiment in terms of the number of first terminal electrodes to which one first inner electrode layer is connected and the number of second terminal electrodes to which one second inner electrode layer is connected. FIG. 10 is an exploded perspective view of the multilayer body 1 included in the multilayer capacitor in accordance with the fifth embodiment.

As is also shown in FIG. 10, the multilayer body 1 is constructed by alternately laminating a plurality of (9 in this embodiment) dielectric layers 10 with a plurality of (4 each in this embodiment) first and second inner electrodes 160, 170. In the actual multilayer capacitor, the dielectric layers 10 are integrated to such an extent that no boundaries are discernible therebetween.

Each first inner electrode layer 160 includes first lead electrodes 180, 182, 184, 186 and a first capacitor electrode 200. The number of first lead electrodes 180 to 186 in the first inner electrode layer 160 is 4, which is the same as the number of first terminal electrodes 11a to 11d. The first lead electrodes 180 to 186, each having a rectangular form, extend from the first capacitor electrode 200 so as to connect with their corresponding one of the first terminal electrodes 11a to 11d and be taken out to side faces 1a, 1b of the multilayer body 1 formed with the first terminal electrodes 11a to 11d. Specifically, the first lead electrode 180 is taken out to the side face 1a of the multilayer body 1 so as to connect with the first terminal electrode 11a. The first lead electrode 182 is taken out to the side face 1a of the multilayer body 1 so as to connect with the first terminal electrode 11b. The first lead electrode 184 is taken out to the side face 1b of the multilayer body 1 so as to connect with the first terminal electrode 11c. The first lead electrode 186 is taken out to the side face 1b of the multilayer body 1 so as to connect with the first terminal electrode 11d.

Each second inner electrode layer 170 includes second lead electrodes 190, 192, 194, 196 and a second capacitor electrode 210. The number of second lead electrodes 190 to 196 in the second inner electrode layer 170 is 4, which is the same as the number of second terminal electrodes 12a to 12d The second lead electrodes 190 to 196, each having a rectangular form, extend from the second capacitor electrode 210 so as to connect with their corresponding second terminal electrodes 12a to 12d and be taken out to side faces 1a, 1b of the multilayer body 1 formed with the second terminal electrodes 12a to 12d. Specifically, the second lead electrode 190 is taken out to the side face 1a of the multilayer body 1 so as to connect with the second terminal electrode 12a. The second lead electrode 192 is taken out to the side face 1a of the multilayer body 1 so as to connect with the second terminal electrode 12b. The second lead electrode 194 is taken out to the side face 1b of the multilayer body 1 so as to connect with the second terminal electrode 12c. The second lead electrode 196 is taken out to the side face 1b of the multilayer body 1 so as to connect with the second terminal electrode 12d.

The first lead electrodes 180, 182 and second lead electrodes 190, 192 are shifted from each other in the Y direction in FIG. 10. Namely, the first lead electrode 180, second lead electrode 190, first lead electrode 182, and second lead electrode 192 are successively shifted in the +Y direction. The first lead electrodes 184, 186 and second lead electrodes 194, 196 are shifted from each other in the Y direction in FIG. 10. Namely, the first lead electrode 184, second lead electrode 194, first lead electrode 186, and second lead electrode 196 are successively shifted in the +Y direction.

The first capacitor electrodes 200 forming a capacitance component of the capacitor are formed at respective positions separated by a predetermined distance from each side face of the multilayer body 1 parallel to the Z axis. Each first capacitor electrode 200 includes first capacitor lead electrodes 220, 222, 224, 226 and a first capacitor main electrode 240.

The number of first capacitor lead electrodes 220 to 226 is the same as the total number of first lead electrodes 180 to 186, i.e., 4. As shown in FIG. 10, the first capacitor lead electrodes 220 to 226 are formed continuous with their corresponding first lead electrodes 180 to 186 by respective four slit pairs 260, 262, 264, 266. The four pairs of slits 260 to 266 are narrow rectangular incisions formed so as to extend along the X axis from both ends in the direction of Y-axis where the first lead electrodes 180 to 186 connect with the first capacitor electrode 200. The first capacitor lead electrode 220 is formed continuous with the first lead electrode 180 by the slits 260. The first capacitor lead electrode 222 is formed continuous with the first lead electrode 182 by the slits 262. The first capacitor lead electrode 224 is formed continuous with the first lead electrode 184 by the slits 264. The first capacitor lead electrode 226 is formed continuous with the first lead electrode 186 by the slits 266. As shown in FIG. 10, the first capacitor main electrode 240 is formed so as to be separated from the first lead electrodes 180 to 186 by their corresponding four slit pairs 260 to 266.

The second capacitor electrodes 210 forming a capacitance component of the capacitor are formed at respective positions separated by a predetermined distance from each side face of the multilayer body 1 parallel to the Z axis. Each second capacitor electrode 210 includes second capacitor lead electrodes 230 to 236 and a second capacitor main electrode 250.

The number of second capacitor lead electrodes 230 to 236 is the same as the total number of second lead electrodes 190 to 196, i.e., 4. As shown in FIG. 10, the second capacitor lead electrodes 230 to 236 are formed continuous with their corresponding second lead electrodes 190 to 196 by respective four slit pairs 270, 272, 274, 276. The four pairs of slits 270 to 276 are narrow rectangular incisions formed so as to extend along the X axis from both ends in the direction of Y-axis where the second lead electrodes 190 to 196 connect with the second capacitor electrode 210. The second capacitor lead electrode 230 is formed continuous with the second lead electrode 190 by the slits 270. The second capacitor lead electrode 232 is formed continuous with the second lead electrode 192 by the slits 272. The second capacitor lead electrode 234 is formed continuous with the second lead electrode 194 by the slits 274. The second capacitor lead electrode 236 is formed continuous with the second lead electrode 196 by the slits 276. As shown in FIG. 10, the second capacitor main electrode 250 is formed so as to be separated from the second lead electrodes 190 to 196 by their corresponding four slit pairs 270 to 276.

The first capacitor electrode 200 and second capacitor electrode 210 are positioned so as to align with each other in the Z-axis direction.

As shown in FIG. 10, the first and second capacitor lead electrodes 220 to 226, 230 to 236 are formed continuous with the first and second lead electrodes 180 to 186, 190 to 196 by the slits 260 to 266, 270 to 276, respectively, and can function as lead electrodes. Therefore, portions substantially corresponding to lead electrodes become longer as for the first and second inner electrode layers 160, 170. Consequently, the multilayer capacitor in accordance with the fifth embodiment can increase the equivalent series resistance while keeping its capacitance.

The first and second capacitor lead electrodes 220 to 226, 230 to 236 are formed by the slits 260 to 266, 270 to 276, and vary their lengths depending on the lengths of the slits 260 to 266, 270 to 276 in the X-axis direction. Therefore, the multilayer capacitor in accordance with the fifth embodiment can change the value of equivalent series resistance by simply altering the lengths of the slits 260 to 266, 270 to 276, and can easily regulate the equivalent series resistance.

Since the value of equivalent series resistance of the multilayer capacitor can be changed by simply altering the lengths of the slits 260 to 266, 270 to 276, the equivalent series resistance of the multilayer capacitor in accordance with the fifth embodiment can be set to a desirable value depending on the lengths of the slits 260 to 266, 270 to 276. Thus, a multilayer capacitor having a desirable value of equivalent series resistance can be obtained.

Sixth Embodiment

Figure 11:
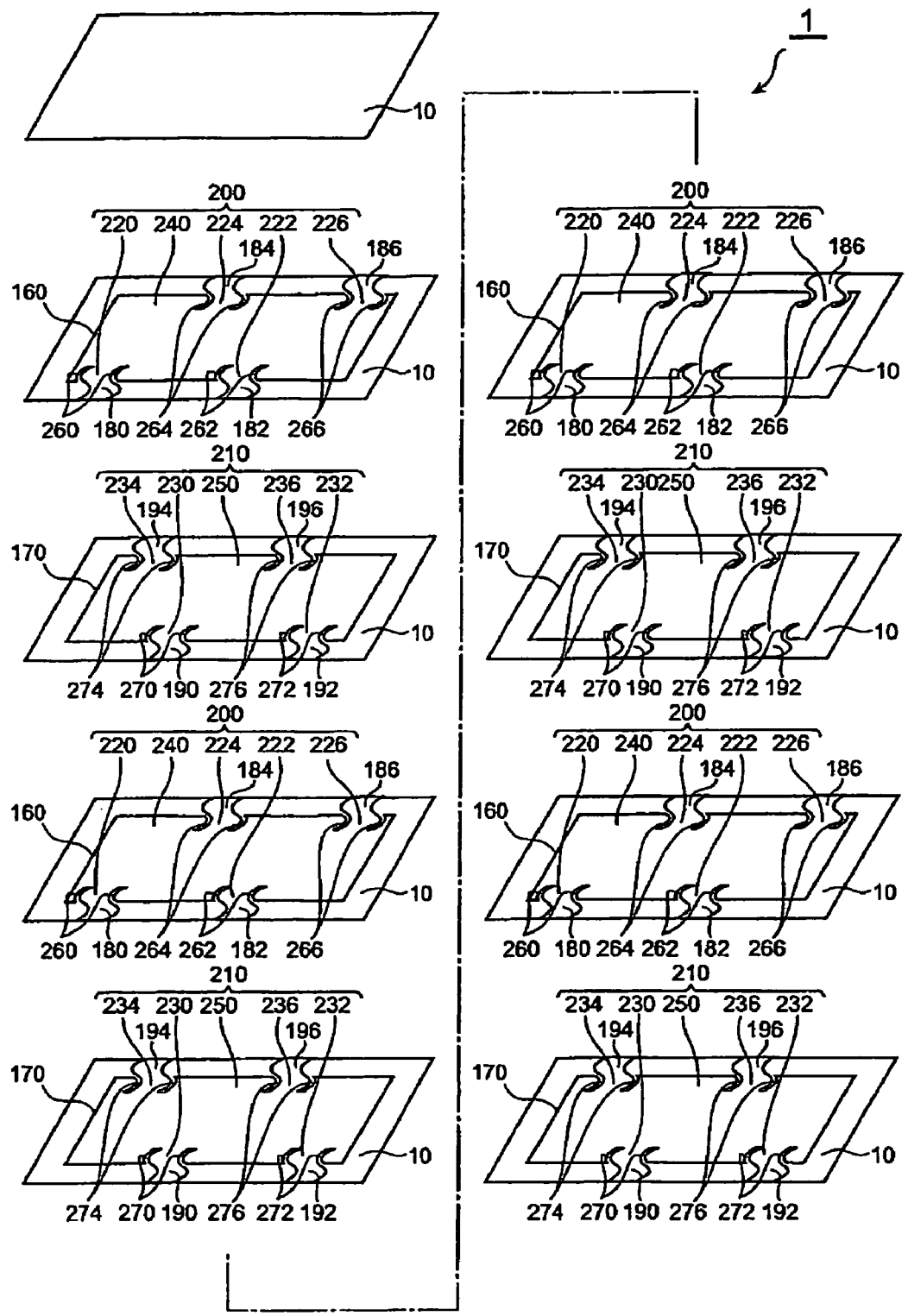
FIG. 11 is an exploded perspective view of the multilayer body included in the multilayer capacitor in accordance with a sixth embodiment.

The structure of the multilayer capacitor in accordance with a sixth embodiment will be explained with reference to FIG. 11. The multilayer capacitor in accordance with the sixth embodiment differs from the multilayer capacitor in accordance with the fifth embodiment in terms of the form of capacitor lead electrodes. FIG. 11 is an exploded perspective view of the multilayer body 1 included in the multilayer capacitor in accordance with the sixth embodiment.

In the multilayer body 1, as shown in FIG. 11, each of first and second capacitor lead electrodes 220 to 226, 230 to 236 has a meandering form. Each of first and second lead electrodes 180 to 186, 190 to 196 continuous with the first and second capacitor lead electrodes 220 to 226, 230 to 236 also has a meandering form.

In the multilayer capacitor in accordance with this embodiment, as in the foregoing, portions substantially corresponding to lead electrodes for first and second inner electrode layers 160, 170 become longer. Therefore, as in the multilayer capacitor in accordance with the fifth embodiment, the equivalent series resistance can be made greater while securing a capacitance.

In particular, the multilayer capacitor in accordance with the sixth embodiment elongates the first and second capacitor lead electrodes 220 to 226, 230 to 236, which also function as lead electrodes, by making them meander. As a result, portions substantially corresponding to lead electrodes for the first and second inner electrode layers 160, 170 become longer, whereby the value of equivalent series resistance can be made greater.

As with the multilayer capacitor in accordance with the fifth embodiment, the multilayer capacitor in accordance with the sixth embodiment can change the value of equivalent series resistance by simply altering respective lengths of four slit pairs 260 to 266, 270 to 276, and thus can easily regulate the equivalent series resistance. Further, the equivalent series resistance of the multilayer capacitor can be set to a desirable value depending on the respective lengths of the four slit pairs 260 to 266, 270 to 276, whereby a multilayer capacitor having a desirable value of equivalent series resistance can be obtained.

The first and second lead electrodes 180 to 186, 190 to 196 may have rectangular forms, for example, instead of meandering forms. It is not necessary for all of the first and second capacitor lead electrodes 220 to 226, 230 to 236 to have meandering forms. For example, it will be sufficient if one of two species of the first and second capacitor lead electrodes 220 to 226, 230 to 236 have a meandering form. Alternatively, for example, it will be sufficient if a portion of the first capacitor lead electrodes 220 to 226 has a meandering form.

Figure 12:
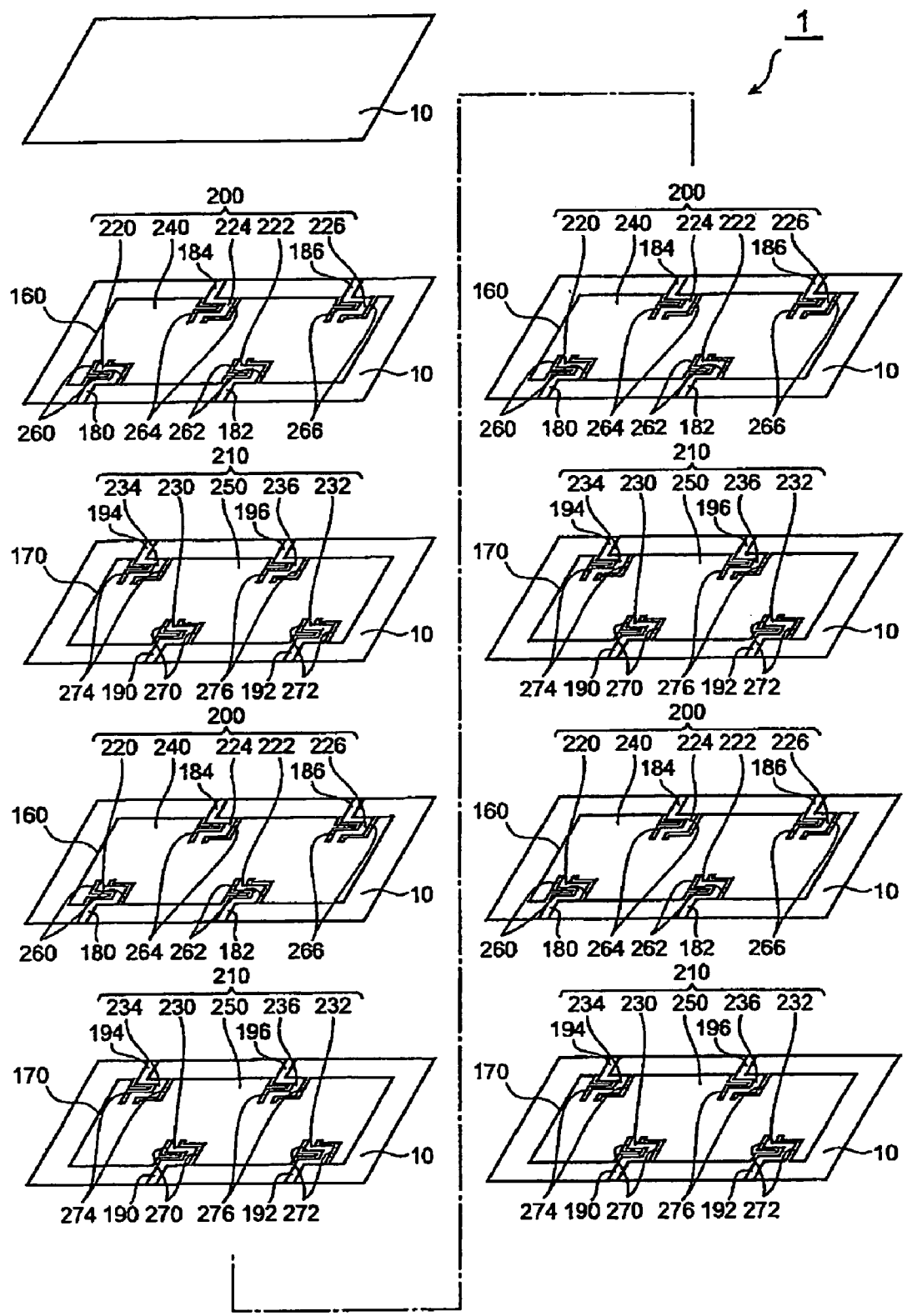
FIG. 12 is an exploded perspective view of the multilayer body included in a modified example of the multilayer capacitor in accordance with the sixth embodiment.

The first and second capacitor lead electrodes 220 to 226, 230 to 236 and the first and second lead electrodes 180 to 186, 190 to 196 may have crank-shaped forms as shown in FIG. 12.

Seventh Embodiment

Figure 13:
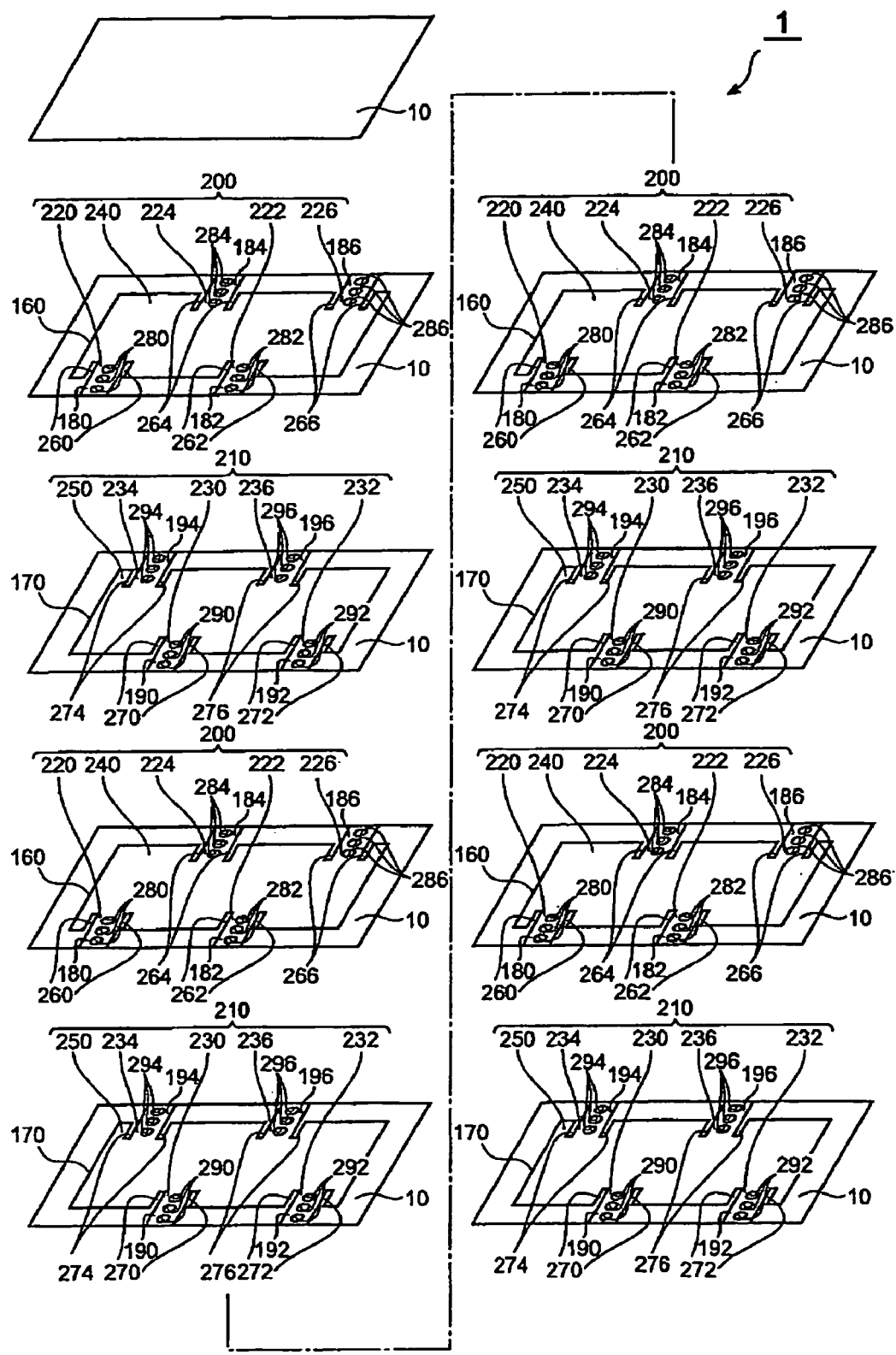
FIG. 13 is an exploded perspective view of the multilayer body included in the multilayer capacitor in accordance with a seventh embodiment.

With reference to FIG. 13, the structure of the multilayer capacitor in accordance with a seventh embodiment will be explained. The multilayer capacitor in accordance with the seventh embodiment differs from the multilayer capacitor in accordance with the fifth embodiment in that capacitor lead electrodes or lead electrodes have openings. FIG. 13 is an exploded perspective view of the multilayer body 1 included in the multilayer capacitor in accordance with the seventh embodiment.

In the multilayer body 1, as shown in FIG. 13, first and second lead electrodes 180 to 186, 190 to 196 and first and second capacitor lead electrodes 220 to 226, 230 to 236 have circular openings 280, 282, 284, 286, 290, 292, 294, 296. The openings 280 to 286 are formed by respective rows of three circular apertures aligning in the X-axis direction in portions where the first lead electrodes 180 to 186 are continuous with their corresponding first capacitor lead electrodes 220 to 226. The openings 290 to 296 are formed by respective rows of three circular apertures aligning in the X-axis direction in portions where the second lead electrodes 190 to 196 are continuous with their corresponding second capacitor lead electrodes 230 to 236.

In the multilayer capacitor in accordance with this embodiment, as in the foregoing, portions substantially corresponding to lead electrodes for the first and second inner electrode layers 160, 170 become longer. Therefore, as in the multilayer capacitor in accordance with the fifth embodiment, the equivalent series resistance can be made greater while securing a capacitance.

In particular, since the first and second capacitor lead electrodes 220 to 226, 230 to 236 and first and second lead electrodes 180 to 186, 190 to 196 have the openings, the multilayer capacitor in accordance with the seventh embodiment reduces the area of portions substantially corresponding to lead electrodes. As a result, the value of equivalent series resistance can be made greater.

As with the multilayer capacitor in accordance with the fifth embodiment, the multilayer capacitor in accordance with the seventh embodiment can change the value of equivalent series resistance by simply altering respective lengths of four slit pairs 260 to 266, 270 to 276, and thus can easily regulate the equivalent series resistance. Further, the equivalent series resistance of the multilayer capacitor can be set to a desirable value depending on the respective lengths of the slits 260 to 266, 270 to 276, whereby a multilayer capacitor having a desirable value of equivalent series resistance can be obtained.

It is not necessary for all the portions of both the first and second lead electrodes 180 to 186, 190 to 196 and the first and second capacitor lead electrodes 220 to 226, 230 to 236 to have openings. It will be sufficient if a portion of them has an opening. For example, the first and second lead electrodes 180 to 186, 190 to 196, which are one of two species of the first and second lead electrodes 180 to 186, 190 to 196 and first and second capacitor lead electrodes 220 to 226, 230 to 236, may have openings alone. Alternatively, for example, the first capacitor lead electrodes 180 to 186 may have openings alone.

Figure 14:
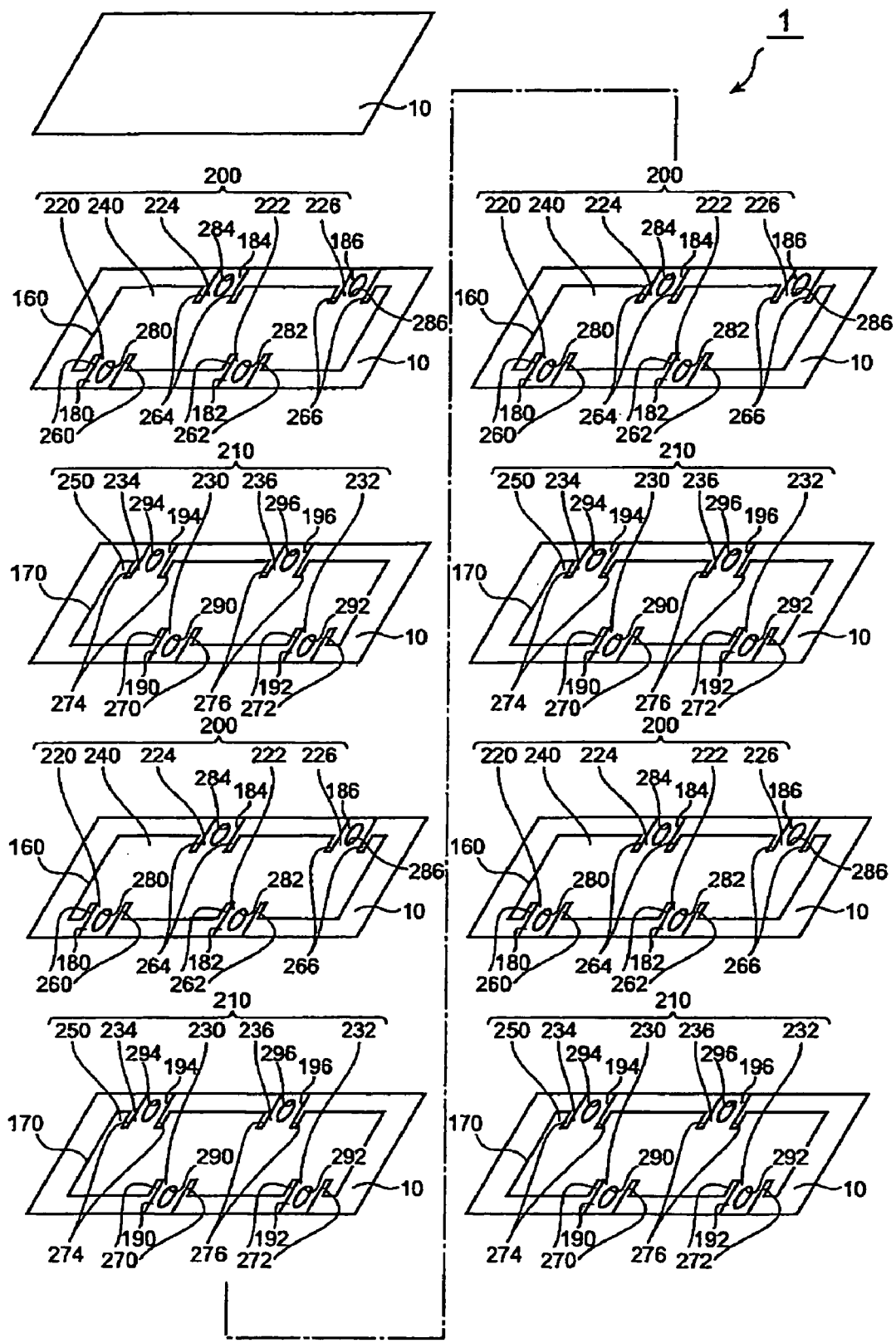
FIG. 14 is an exploded perspective view of the multilayer body included in a modified example of the multilayer capacitor in accordance with the seventh embodiment.
Figure 15:
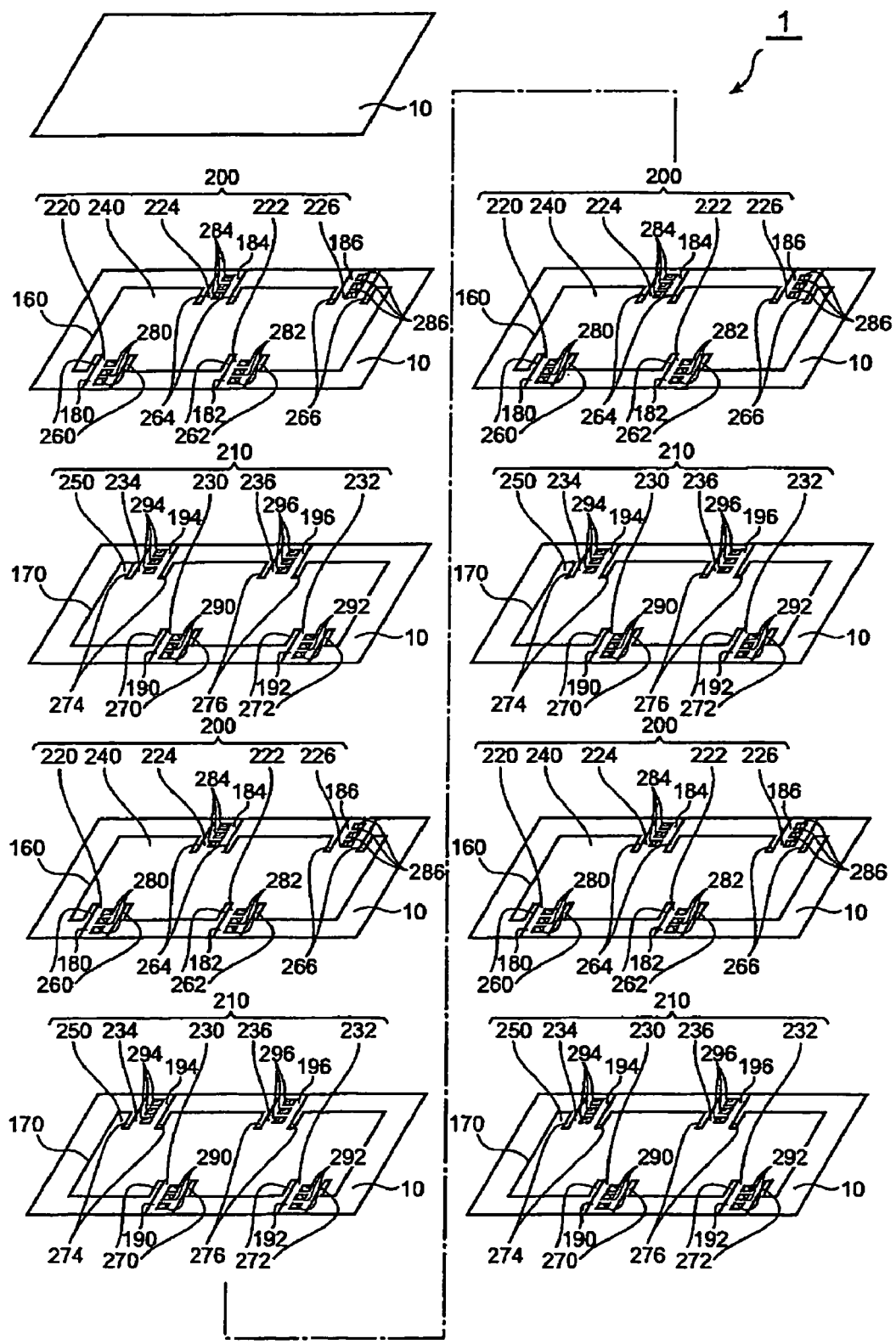
FIG. 15 is an exploded perspective view of the multilayer body included in a modified example of the multilayer capacitor in accordance with the seventh embodiment.
Figure 16:
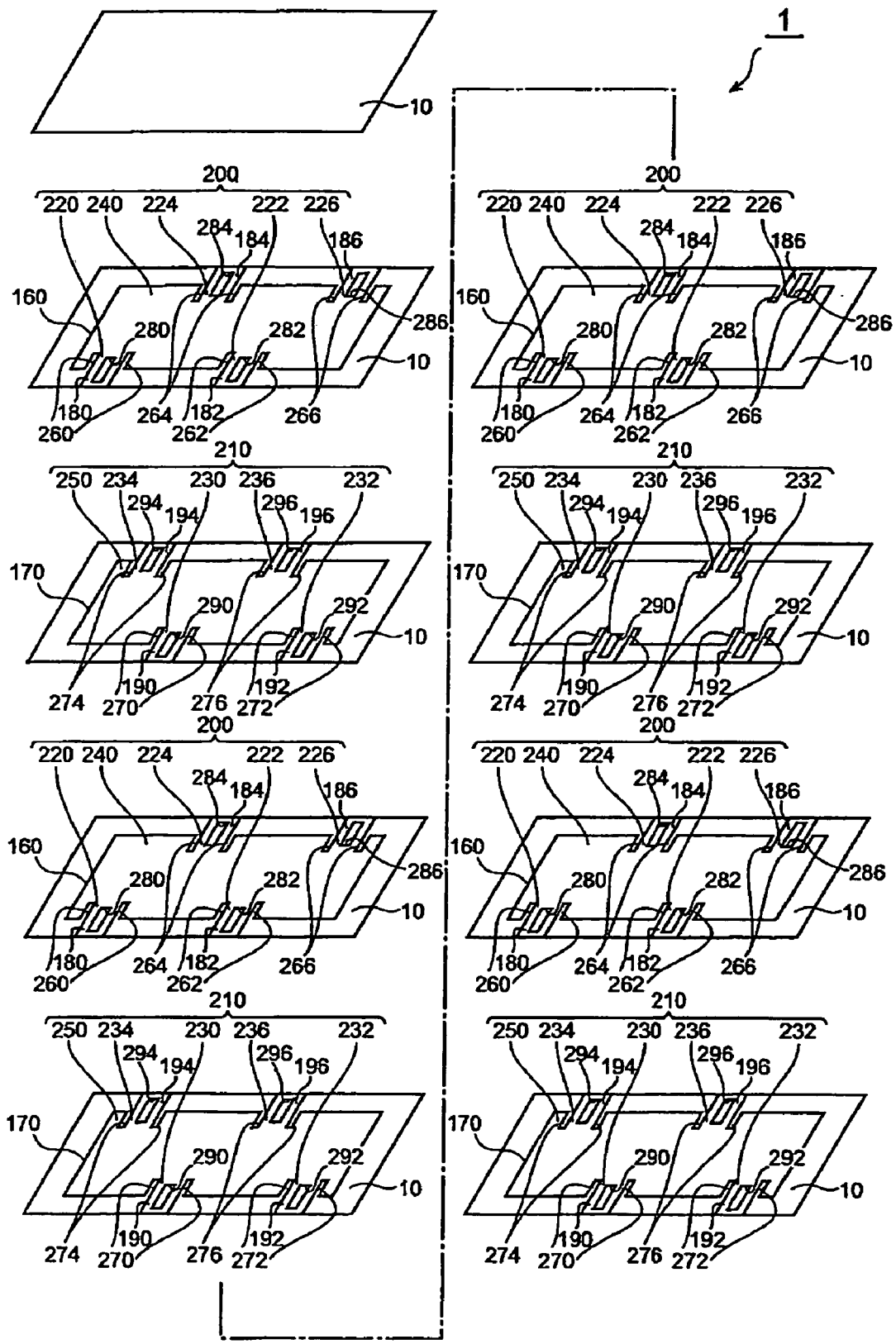
FIG. 16 is an exploded perspective view of the multilayer body included in a modified example of the multilayer capacitor in accordance with the seventh embodiment.

The openings 280 to 286, 290 to 296 are not limited to those having circular forms as shown in FIG. 13. For example, as shown in FIG. 14, each of the openings 280 to 286, 290 to 296 may be a single elliptical aperture elongated in the X-axis direction. Alternatively, as shown in FIG. 15, each of the openings 280 to 286, 290 to 296 may be constituted by a row of three rectangular apertures aligning in the X-axis direction. Alternatively, as shown in FIG. 16, each of the openings 280 to 286, 290 to 296 may have a rectangular form elongated in the X-axis direction.

Eighth Embodiment

Figure 17:
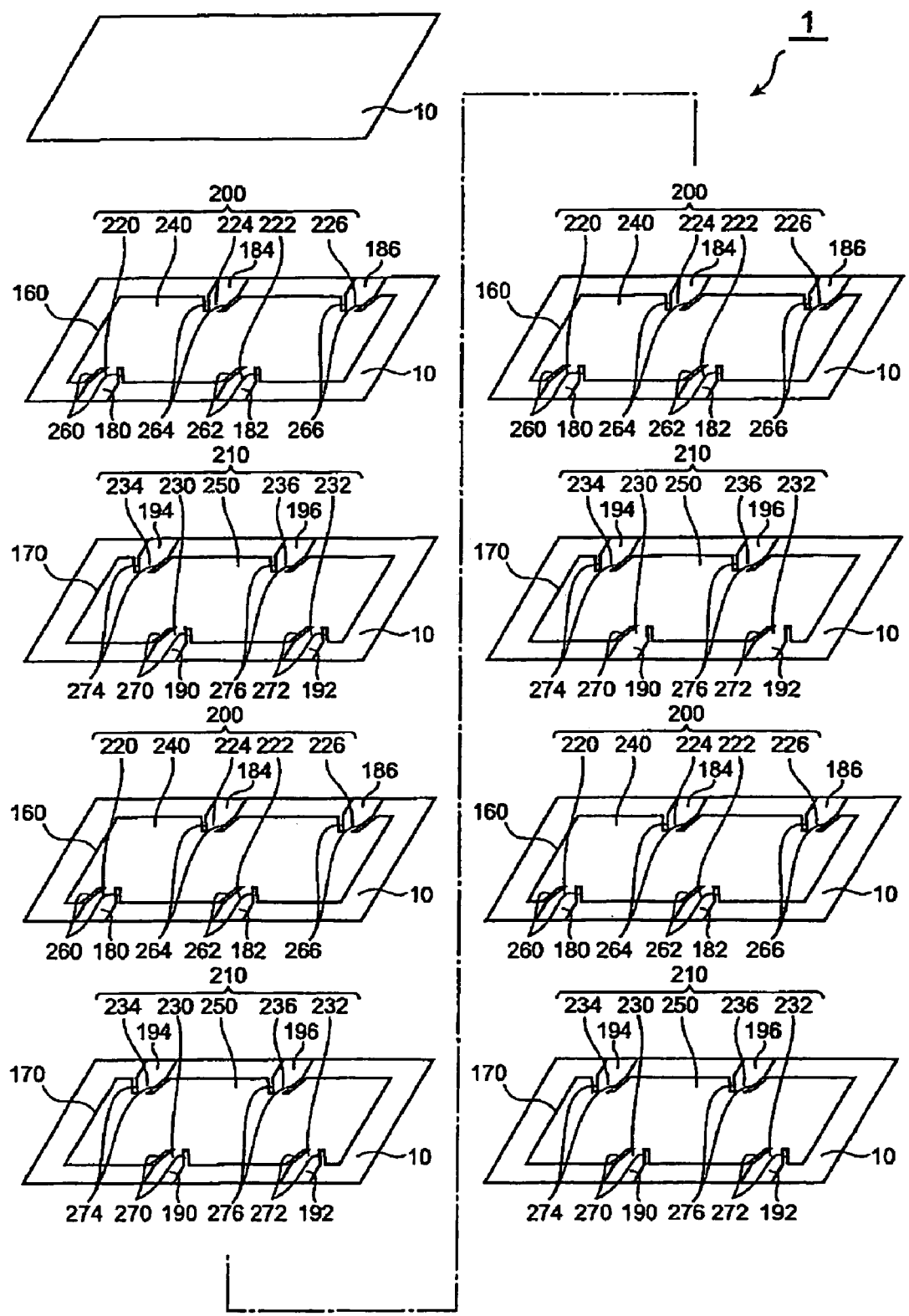
FIG. 17 is an exploded perspective view of the multilayer body included in the multilayer capacitor in accordance with an eighth embodiment.

The structure of the multilayer capacitor in accordance with an eighth embodiment will be explained with reference to FIG. 17. The multilayer capacitor in accordance with the eighth embodiment differs from the multilayer capacitor in accordance with the fifth embodiment in terms of the form of capacitor lead electrodes. FIG. 17 is an exploded perspective view of the multilayer body 1 included in the multilayer capacitor in accordance with the eighth embodiment.

As shown in FIG. 17, in terms of the width that is perpendicular to the direction in which a plurality of dielectric layers 10 and a plurality of inner electrodes 160, 170 are laminated and is parallel to side faces of the multilayer body 1 to which the first and second lead electrodes 180 to 186, 190 to 196 are taken out, first and second capacitor lead electrodes 220 to 226, 230 to 236 in the multilayer body 1 are narrower in places where they connect with first and second capacitor main electrodes 240, 250 than in places where they connect with lead electrodes. Namely, as shown in FIG. 17, the width in the Y-axis direction of the first capacitor lead electrodes 220 to 226 is narrower in places connecting with the first capacitor main electrodes 240 than in places connecting with the first lead electrodes 220 to 226. In other words, the first capacitor lead electrodes 220 to 226 are set narrower on the side (i.e., the rest side) connected to the first capacitor main electrodes 240 than on the side connected to the first lead electrodes 180 to 186. The width in the Y-axis direction of the second capacitor lead electrodes 230 to 236 is narrower in places connecting with the second capacitor main electrodes 250 than in places connecting with the second lead electrodes 190 to 196. In other words, the second capacitor lead electrodes 230 to 236 are set narrower on the side (i.e., the rest side) connected to the second capacitor main electrodes 250 than on the side connected to the second lead electrodes 190 to 196.

In the multilayer capacitor in accordance with this embodiment, as in the foregoing, portions substantially corresponding to lead electrodes for the first and second inner electrode layers 160, 170 become longer. Therefore, as in the multilayer capacitor in accordance with the fifth embodiment, the equivalent series resistance can be made greater while securing a capacitance.

In particular, the width in the Y-axis direction of the first and second capacitor lead electrodes 220 to 226, 230 to 236 is narrower in the respective places connecting with the first and second capacitor main electrodes 240, 250 than in the respective places connecting with the first and second lead electrodes 180 to 186, 190 to 196 in the multilayer capacitor in accordance with the eighth embodiment.

As with the multilayer capacitor in accordance with the fifth embodiment, the multilayer capacitor in accordance with the eighth embodiment can change the value of equivalent series resistance by simply altering respective lengths of four slit pairs 260 to 266, 270 to 276, and thus can easily regulate the equivalent series resistance. Further, the equivalent series resistance of the multilayer capacitor can be set to a desirable value depending on the respective lengths of the four slit pairs 260 to 266, 270 to 276, whereby a multilayer capacitor having a desirable value of equivalent series resistance can be obtained.

It is not necessary for all of the first and second lead electrodes 220 to 226, 230 to 236 to have such a form as to change their width in the Y-axis direction. For example, it will be sufficient if one of two species of the first and second capacitors lead electrodes 220 to 226, 230 to 236 have such a form as to change their width in the Y-axis direction, while the other capacitor lead electrodes may be formed with a fixed width in the Y-axis direction.

Though preferred embodiments of the present invention are explained in detail in the foregoing, the present invention is not limited to the above-mentioned embodiments and modified examples. For example, the number of laminated dielectric layers 10 and the number of laminated first and second inner electrodes 20 to 26, 30 to 36, 160, 170 are not limited to those described in the above-mentioned embodiments. The number of kinds of first and second inner electrode layers in the first to fourth embodiments is not limited to 4, but may be 1, for example.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multilayer capacitor comprising a multilayer body in which a plurality of dielectric layers and a plurality of inner electrode layers are alternately laminated, and a plurality of terminal electrodes formed on the multilayer body;
    wherein the plurality of inner electrode layers include first and second inner electrode layers alternately arranged;
    wherein the plurality of terminal electrodes include first and second terminal electrodes electrically insulated from each other;
    wherein the first inner electrode layer includes a first lead electrode connected to the first terminal electrode and a first capacitor electrode forming a capacitance component;
    wherein the second inner electrode layer includes a second lead electrode connected to the second terminal electrode and a second capacitor electrode forming a capacitance component;
    wherein the first capacitor electrode is provided with a pair of slits extending from a periphery corresponding to the first lead electrode, and a portion of the first capacitor electrode positioned between the pair of slits is continuous with the first lead electrode; and
    wherein the second capacitor electrode is provided with a pair of slits extending from a periphery corresponding to the second lead electrode and a portion of the second capacitor electrode positioned between the pair of slits is continuous with the second lead electrode.

2. A multilayer capacitor according to claim 1, wherein at least one of the respective portions of the first and second capacitor electrodes positioned between the pairs of slits has a meandering or crank-shaped form.

3. A multilayer capacitor according to claim 1, wherein at least one of the first and second lead electrodes has an opening.

4. A multilayer capacitor according to claim 1, wherein at least one of the respective portions of the first and second capacitor electrodes positioned between the pairs of slits has an opening.

5. A multilayer capacitor according to claim 1, wherein the portion of the first capacitor electrode positioned between the pair of slits has a width set narrower on the rest side than on the side connected to the first lead electrode.

6. A multilayer capacitor according to claim 1, wherein the portion of the second capacitor electrode positioned between the pair of slits has a width set narrower on the rest side than on the side connected to the second lead electrode.

7. A multilayer capacitor according to claim 1, wherein an equivalent series resistance is set to a desirable value by regulating a length of the slits.

8. A multilayer capacitor comprising a multilayer body in which a plurality of dielectric layers and a plurality of inner electrode layers are alternately laminated, and a plurality of terminal electrodes formed on the multilayer body;
    wherein the plurality of inner electrode layers include a plurality of first inner electrode layers and a plurality of second inner electrode layers alternately arranged;
    wherein the plurality of terminal electrodes include a plurality of first terminal electrodes and a plurality of second terminal electrodes electrically insulated from each other;
    wherein the first inner electrode layer includes a first lead electrode connected to one of the plurality of first terminal electrodes and a first capacitor electrode forming a capacitance component;
    wherein the second inner electrode layer includes a second lead electrode connected to one of the plurality of second terminal electrodes and a second capacitor electrode forming a capacitance component;
    wherein the first capacitor electrode is provided with a pair of slits extending from a periphery corresponding to the first lead electrode and a portion of the first capacitor electrode positioned between the pair of slits is continuous with the first lead electrode; and
    wherein the second capacitor electrode is provided with a pair of slits extending from a periphery corresponding to the second lead electrode and a portion of the second capacitor electrode positioned between the pair of slits is continuous with the second lead electrode.

9. A multilayer capacitor according to claim 8, wherein at least one of the respective portions of the first and second capacitor electrodes positioned between the pairs of slits has a meandering or crank-shaped form.

10. A multilayer capacitor according to claim 8, wherein at least one of the first and second lead electrodes has an opening.

11. A multilayer capacitor according to claim 8, wherein at least one of the respective portions of the first and second capacitor electrodes positioned between the pairs of slits has an opening.

12. A multilayer capacitor according to claim 8, wherein the portion of the first capacitor electrode positioned between the pair of slits has a width set narrower on the rest side than on the side connected to the first lead electrode.

13. A multilayer capacitor according to claim 8, wherein the portion of the second capacitor electrode positioned between the pair of slits has a width set narrower on the rest side than on the side connected to the second lead electrode.

14. A multilayer capacitor according to claim 8, wherein an equivalent series resistance is set to a desirable value by regulating a length of the slits.

15. A multilayer capacitor comprising a multilayer body in which a plurality of dielectric layers and a plurality of inner electrode layers are alternately laminated, and a plurality of terminal electrodes formed on the multilayer body;

wherein the plurality of inner electrode layers include a plurality of first inner electrode layers and a plurality of second inner electrode layers alternately arranged;

wherein the plurality of terminal electrodes include a plurality of first terminal electrodes and a plurality of second terminal electrodes electrically insulated from each other;

wherein the first inner electrode layer includes a plurality of first lead electrodes respectively connected to the plurality of first terminal electrodes and a first capacitor electrode forming a capacitance component;

wherein the second inner electrode layer includes a plurality of second lead electrodes respectively connected to the plurality of second terminal electrodes and a second capacitor electrode forming a capacitance component;

wherein the first capacitor electrode is provided with a plurality of pairs of slits extending from respective peripheries corresponding to the first lead electrodes and respective portions of the first capacitor electrode positioned between the respective pairs of slits are continuous with the corresponding first lead electrodes; and wherein the second capacitor electrode is provided with a plurality of pairs of slits extending from respective peripheries corresponding to the second lead electrodes and respective portions of the second capacitor electrode positioned between the respective pairs of slits are continuous with the corresponding second lead electrodes.

16. A multilayer capacitor according to claim 15, wherein at least one of the respective portions of the first and second capacitor electrodes positioned between the respective pairs of slits has a meandering or crank-shaped form.

17. A multilayer capacitor according to claim 15, wherein at least one of the first and second lead electrodes has an opening.

18. A multilayer capacitor according to claim 15, wherein at least one of the respective portions of the first and second capacitor electrodes positioned between the respective pairs of slits has an opening.

19. A multilayer capacitor according to claim 15, wherein the portion of the first capacitor electrode positioned between the pair of slits has a width set narrower on the rest side than on the side connected to the first lead electrode.

20. A multilayer capacitor according to claim 15, wherein the portion of the second capacitor electrode positioned between the pair of slits has a width set narrower on the rest side than on the side connected to the second lead electrode.

21. A multilayer capacitor according to claim 15, wherein an equivalent series resistance is set to a desirable value by regulating a length of the slits.

* * * * *